US012330728B2

(12) United States Patent
Andringa

(10) Patent No.: US 12,330,728 B2
(45) Date of Patent: Jun. 17, 2025

(54) WORK VEHICLE AUXILIARY AXLE CONTROL

(71) Applicant: Oshkosh Corporation, Oshkosh, WI (US)

(72) Inventor: Jeremy Andringa, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 157 days.

(21) Appl. No.: 18/075,209

(22) Filed: Dec. 5, 2022

(65) Prior Publication Data
US 2023/0174178 A1 Jun. 8, 2023

Related U.S. Application Data

(60) Provisional application No. 63/286,802, filed on Dec. 7, 2021.

(51) Int. Cl.
*B62D 61/12* (2006.01)

(52) U.S. Cl.
CPC .................. *B62D 61/125* (2013.01)

(58) Field of Classification Search
CPC .................. B62D 61/125; B62D 61/12; B60G 2300/0262; B60G 2300/402; B60G 2400/61
See application file for complete search history.

(56) References Cited

U.S. PATENT DOCUMENTS

| | | | | |
|---|---|---|---|---|
| 6,007,078 A | * | 12/1999 | Gottschalk | B60G 11/27 280/81.6 |
| 6,240,339 B1 | * | 5/2001 | von Mayenburg | B60G 17/0523 701/72 |
| 6,371,227 B2 | | 4/2002 | Bartlett | |
| 7,434,821 B2 | * | 10/2008 | Hinz | B60G 11/27 280/43 |
| 8,522,933 B2 | * | 9/2013 | Chalin | B60G 9/00 188/266 |
| 8,602,393 B1 | * | 12/2013 | Huffman | B60P 1/548 254/323 |
| 2006/0170168 A1 | * | 8/2006 | Rotz | B62D 61/12 180/209 |
| 2010/0133771 A1 | * | 6/2010 | Hudson | B60G 17/017 701/37 |
| 2015/0151651 A1 | | 6/2015 | Stingle et al. | |
| 2016/0257355 A1 | * | 9/2016 | Siuchta | B60W 40/13 |
| 2016/0332498 A1 | * | 11/2016 | Lindsay | B62D 61/12 |
| 2016/0347388 A1 | * | 12/2016 | Karel | B60G 11/27 |
| 2017/0144639 A1 | * | 5/2017 | Minato | B60T 8/1708 |
| 2019/0276102 A1 | | 9/2019 | Zuleger et al. | |

(Continued)

*Primary Examiner* — Frank B Vanaman
(74) *Attorney, Agent, or Firm* — Foley & Lardner LLP

(57) ABSTRACT

A work vehicle includes a chassis, an axle assembly, an actuator, a parking brake, and a controller. The axle assembly is coupled to the chassis. The actuator is coupled to the chassis and the axle assembly. The actuator is configured to transition the axle assembly between a raised position and a lowered position. The controller includes a processor and a memory. The controller is configured to generate signals to determine a vehicle state based on data representing at least one of a vehicle load, a vehicle location, and a vehicle operating condition; and operate the actuator to transition the axle assembly between the raised position and the lowered position based on the vehicle state.

19 Claims, 18 Drawing Sheets

(56) References Cited

U.S. PATENT DOCUMENTS

| | | |
|---|---|---|
| 2020/0290236 A1 | 9/2020 | Bjornstad et al. |
| 2020/0290237 A1 | 9/2020 | Steffens et al. |
| 2020/0290238 A1 | 9/2020 | Andringa et al. |
| 2020/0291846 A1 | 9/2020 | Steffens et al. |
| 2021/0144924 A1* | 5/2021 | Schrag ................ A01D 41/127 |
| 2021/0171137 A1 | 6/2021 | Zuleger et al. |
| 2021/0237574 A1* | 8/2021 | Jahns ................ B60C 23/0401 |
| 2021/0354329 A1 | 11/2021 | Hou et al. |
| 2022/0072736 A1 | 3/2022 | Steffens et al. |
| 2022/0118854 A1 | 4/2022 | Davis et al. |
| 2022/0134372 A1 | 5/2022 | Andringa |
| 2022/0134856 A1 | 5/2022 | Andringa et al. |
| 2022/0289290 A1 | 9/2022 | Andringa et al. |
| 2023/0070279 A1 | 3/2023 | Wheeler et al. |
| 2023/0070769 A1 | 3/2023 | Wheeler et al. |
| 2023/0074504 A1 | 3/2023 | Ellifson et al. |

* cited by examiner

WORK VEHICLE AUXILIARY AXLE CONTROL

CROSS REFERENCE TO RELATED APPLICATION

This U.S. Application claims the benefit of and priority to U.S. Provisional Application No. 63/286,802, filed Dec. 7, 2021, the disclosure of which is incorporated herein by reference in its entirety.

BACKGROUND

The present invention relates generally to the field of work vehicles (e.g., load hauling vehicles, dump trucks, over-the-road tractors and trailers, transit concrete mixing trucks, transit refuse collection vehicles, etc.). More specifically, work vehicles that have at least one auxiliary axle system (e.g., an auxiliary pusher axle, a tag axle systems, a load span tag axle, a trailing auxiliary axle, a liftable/ selectively deployable auxiliary axle, a pressure adjustable auxiliary axle, etc.). An auxiliary axle system may provide additional load-support, particularly in-transit when the work vehicle is substantially full. Auxiliary axle systems are operable between a raised position, in which it is carried by the truck, and a lowered/deployed position in which the auxiliary axle and its wheels share the truck's load. Not only does an auxiliary axle system assist in balancing the load carried by the work vehicle, it may facilitate the work vehicle carrying a higher total payload than would otherwise be permitted, because weight restrictions placed on vehicles traveling over roadways and highways are typically measured in terms of load per axle in combination with overall spacing between axles of a vehicle. By deploying an auxiliary axle system, the number of axles as well as the spacing thereof can be increased when the truck is heavily loaded, thereby enabling the truck to transport a higher total legal payload.

One example of a work vehicle that may utilize an auxiliary axle system is a concrete mixer vehicle. Concrete mixer vehicles are configured to receive, mix, and transport wet concrete or a combination of ingredients that when mixed form wet concrete, to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a work vehicle including a chassis, an axle assembly, an actuator, a parking brake, and a controller. The axle assembly is coupled to the chassis. The actuator is coupled to the chassis and the axle assembly. The actuator is configured to transition the axle assembly between a raised position and a lowered position. The controller includes a processor and a memory. The controller is configured to generate signals to determine a vehicle state based on data representing at least one of a vehicle load, a vehicle location, and a vehicle operating condition; and operate the actuator to transition the axle assembly between the raised position and the lowered position based on the vehicle state.

Another embodiment relates to a work vehicle including a chassis, an axle assembly, an actuator, a parking brake, one or more sensors, and a controller. The axle assembly is coupled to the chassis. The actuator is coupled to the chassis and the axle assembly. The actuator is configured to transition the axle assembly between a raised position and a lowered position. The one or more sensors are configured to detect a location of the chassis. The controller includes a processor and a memory. The controller is configured to generate signals to obtain rules based on the location of the chassis; determine whether the chassis is stationary based on signals from the one or more sensors; and operate the actuator to transition the axle assembly between the raised position and the lowered position based on the determination whether the chassis is stationary and the rules.

Another embodiment relates to a work vehicle including a chassis, an axle assembly, an actuator, a parking brake, a positioning system, and a controller. The axle assembly is coupled to the chassis. The actuator is coupled to the chassis and the axle assembly. The actuator is configured to transition the axle assembly between a raised position and a lowered position. The positioning system is configured to detect a location of the chassis. The controller includes a processor and a memory. The controller is configured to generate signals to determine a value associated with a vehicle load; obtain one or more rules based on the vehicle load and the location of the chassis; and operate the actuator to transition the axle assembly between the raised position and the lowered position based on the one or more rules and the value associated with the vehicle load.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
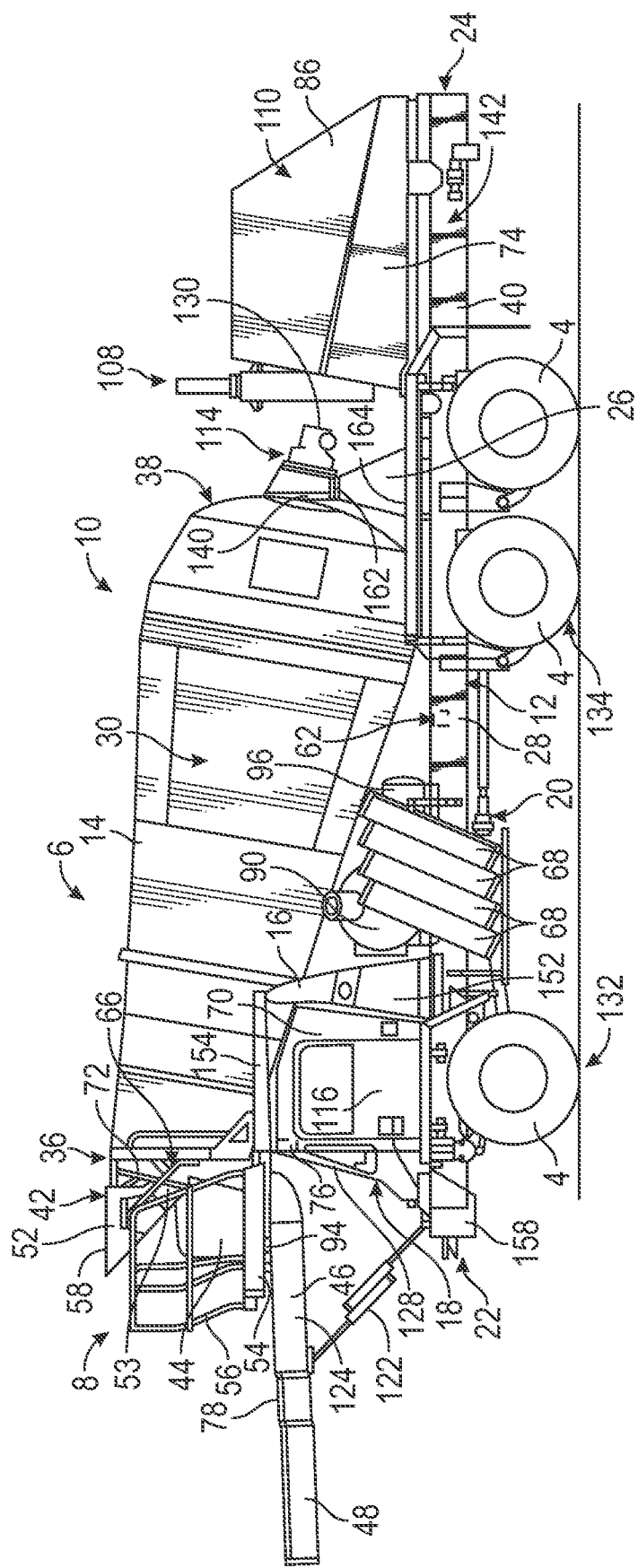
FIG. 1 is a side view of a concrete mixer truck, according to an exemplary embodiment.
Figure 2:
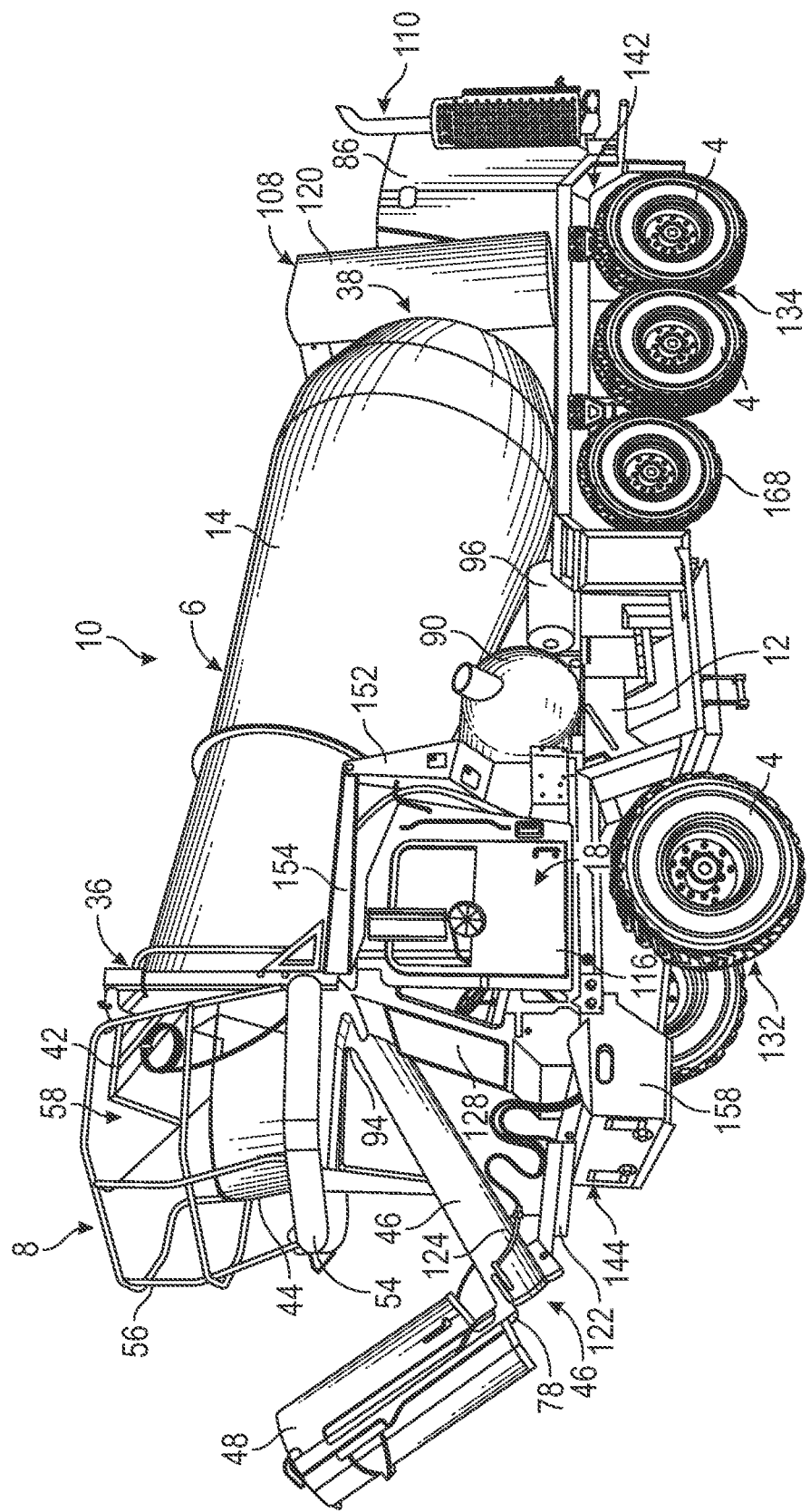
FIG. 2 is a front perspective view of the concrete mixer truck of FIG. 1, according to an exemplary embodiment.
Figure 3:
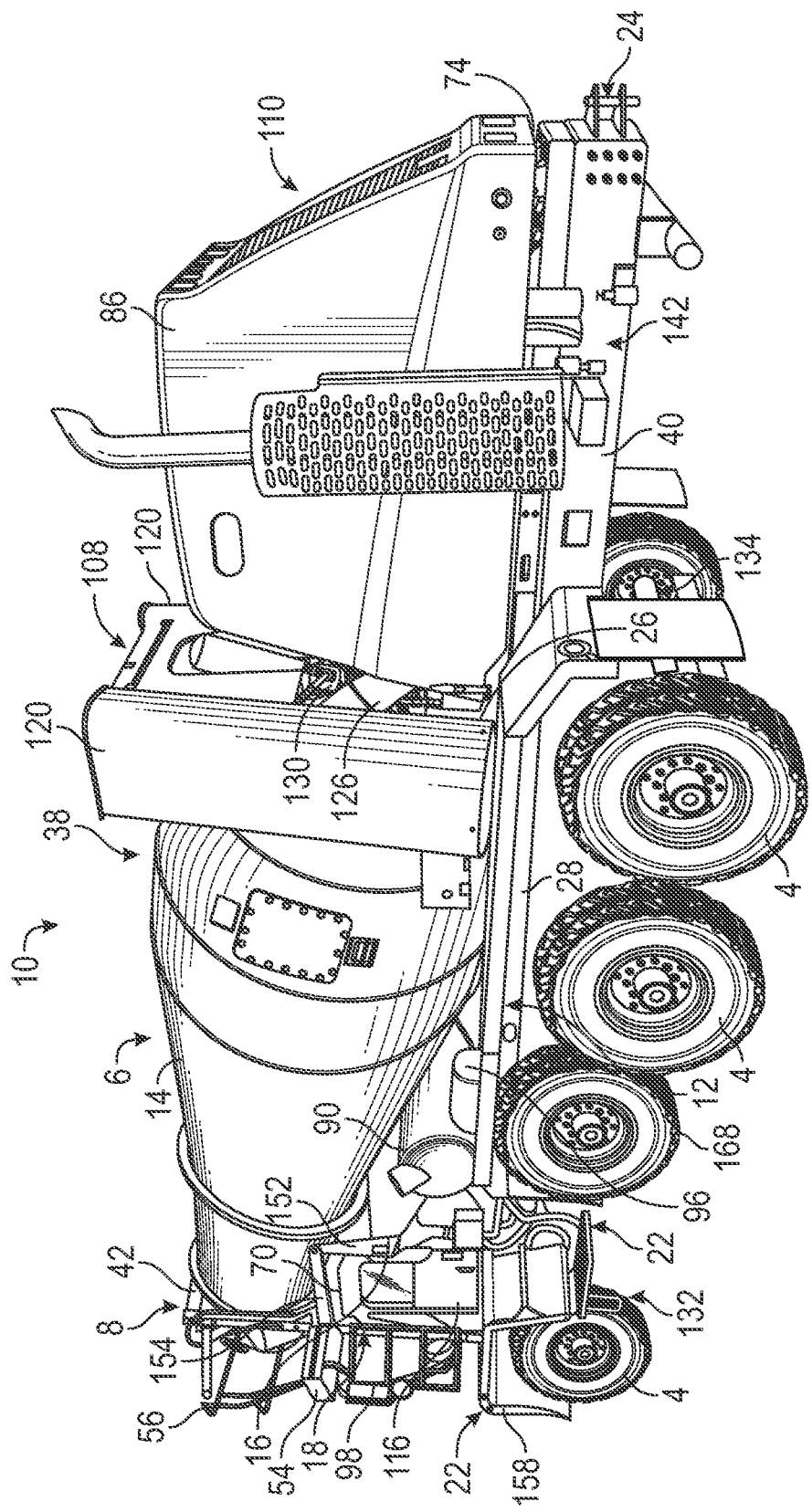
FIG. 3 is a rear perspective view of the concrete mixer truck of FIG. 1, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overall Vehicle

As shown in FIGS. 1-5, a work vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-5, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a supportive surface (e.g., ground, ground surface, etc.) shown as road 29. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12.

The frame 28 includes a pair of frame rails 40 coupled with intermediate cross members, according to an exemplary embodiment. The frame rails 40 extend in a generally-horizontal and longitudinal direction (e.g., extend within ten degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In some embodiments, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of the concrete mixer truck 10 and may be angled relative to the frame rails 40 (e.g., when viewed from the side of the concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-5 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of the mixing drum 14 and the drum drive motor 130 extends rearward from the drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuator (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44, such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124.

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 78, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, auxiliary system, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to rotate wheel and tire assemblies, to drive the transmission, etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank. A rear discharge configuration of the concrete mixer truck 10 is shown and described with respect to FIGS. 16 and 17.

Auxiliary Axle System

Figure 4:
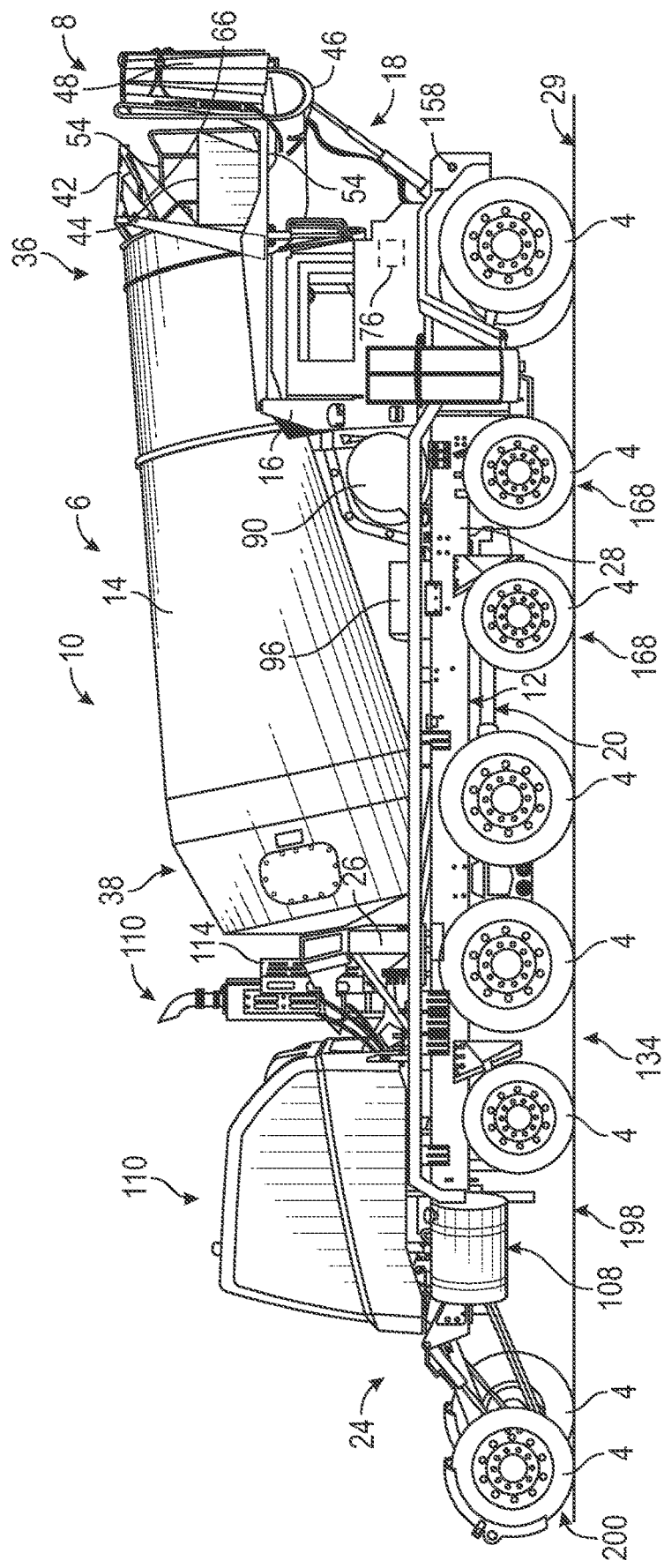
FIG. 4 is a side view of the concrete mixer truck of FIG. 1 with auxiliary axle systems, according to an exemplary embodiment.
Figure 5:
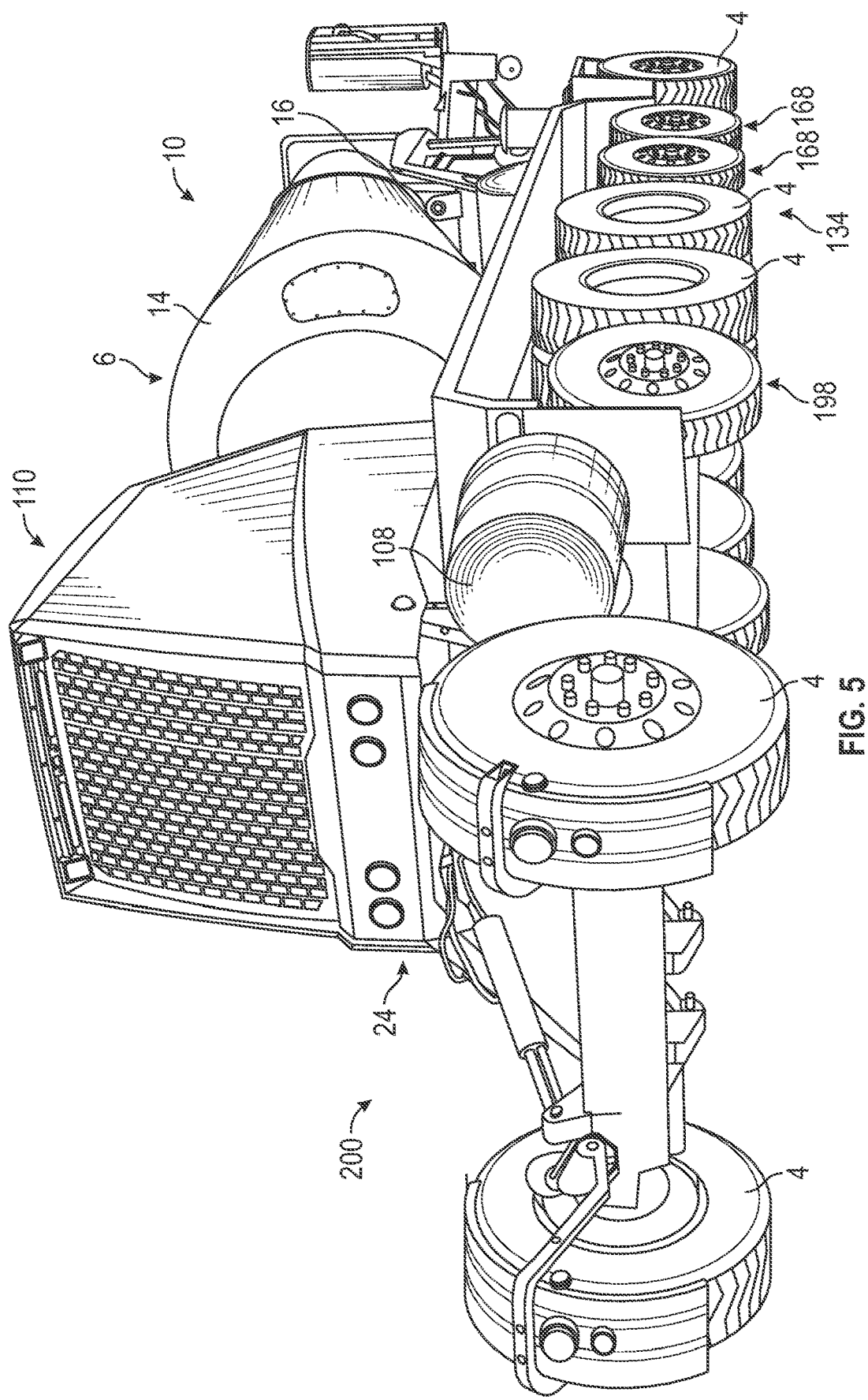
FIG. 5 is a rear perspective view of the concrete mixer truck of FIG. 4, according to an exemplary embodiment.

As shown in FIGS. 4-5, the concrete mixer truck 10 is equipped with two pusher axles 168 located in front of rear axle assemblies 134, a first tag axle 198 located directly behind the rear axle assemblies 134, and a load span tag axle (LSTA) system 200 (e.g., boost axle system, trailing axle system, a load span trailer axle system, trailing liftable axle, etc.). The LSTA system 200 may be used alone or in combination with the pusher axle assemblies 168 discussed above. In some embodiments, a combination of one or more pusher axles 168 and/or tag axles 198, 200 may be selectively deployed to facilitate supporting various loading conditions of the concrete mixer vehicle 10. Various hardware (e.g., mechanisms, actuators, sensors, detectors, etc.) may be used to vary the position and contact pressure of the one or more auxiliary axles with the road 29. An example of a mechanism that can vary the position and contact pressure of an auxiliary axle is a four bar LSTA system described below with reference to FIGS. 4-12.

As shown in FIGS. 4-12, the load span tag axle (LSTA) system 200 is coupled to the vehicle chassis 12 and includes a chassis mount 228 that is rigidly attached to the vehicle chassis 12, and an axle assembly 232 that supports two hubs 236 (each hub 236 configured to support a wheel 4) and is connected to the chassis mount 228 by a four-bar swing linkage that includes a right upper link 240, a left upper link 244, a right lower link 248, and a left lower link 252. A right hydraulic cylinder 256 and a left hydraulic cylinder 260 are connected between the chassis mount 228 and the axle assembly 232 and, in one mode of operation, actuate the axle assembly 232 between a raised position (shown in FIGS. 9-11) and a lowered position (shown in FIGS. 4-8). A hydraulic system (shown in FIG. 12) controls operation of the right hydraulic cylinder 256 and the left hydraulic cylinder 260. In other embodiments, the LSTA system 200 includes another type of actuator in addition to or in place of the right hydraulic cylinder 256 and the left hydraulic cylinder 260 (e.g., a rotary hydraulic actuator, another type of rotary actuator, another type of linear actuator, etc.). In some embodiments, the LSTA system 200 includes one or more actuators for controlling the axle assembly. For example, the LSTA system 200 may include a single actuator (e.g., hydraulic cylinder, left hydraulic cylinder 260, right hydraulic cylinder 256, etc.) for actuating the LSTA system 200. A LSTA system including a single actuator is shown and described with respect to FIG. 18. Various configurations of auxiliary axle systems are possible and the auxiliary axle systems shown are provided for illustration.

The chassis mount 228 is attached to the vehicle chassis 12 (e.g., with fasteners, etc.). In some embodiments, the chassis mount 228 is welded to the vehicle chassis 12 or formed as a part of the vehicle chassis 12. The chassis mount 228 includes a right upper mount bracket 268, a right lower mount bracket 272, a left upper mount bracket 276, and a left lower mount bracket 280. The right upper mount bracket 268 is structured to be connected to the right upper link 240, the right lower mount bracket 272 is structured to be connected to the right lower link 248, the left upper mount bracket 276 is structured to be connected to the left upper link 244, and the left lower mount bracket 280 is structured to be connected to the left lower link 252. In some embodiments, the links 240, 244, 248, 252 are connected to the mount brackets 268, 272, 276, 280 with captured bearings and fastener arrangements. In some embodiments, the links 240, 244, 248, 252 are permitted to move relative to the mount brackets 268, 272, 276, 280 with one degree of freedom (e.g., rotation) and are substantially constrained from moving in a side to side direction.

The axle assembly 232 also includes a right wheel assembly 320 and a left wheel assembly 324. The left wheel assembly 324 is substantially similar to the right wheel assembly 320, with like numerals identifying like components (i.e. components for the left wheel assembly 324 that are similar to the right wheel assembly 320 are denoted using like numbers in prime series). The right wheel assembly 320 is mounted to the axle beam 292 and includes a spindle/knuckle 328, a brake assembly 332, a kingpin 336 coupled between the spindle/knuckle 328 and the axle beam 292 at a kingpin caster angle to allow rotation of the wheel assembly 320 relative to the axle beam 292 thereabout, and a steering arm 340 extending from the spindle/knuckle 328 toward the vehicle chassis 12. The hub 236 is attached to the spindle/knuckle 328 and is free to rotate thereabout. The brake assembly 332 is structured to slow the rotation of the hub 236 via frictional engagement. In some embodiments, the brake assembly 332 is a drum brake assembly, a disk brake assembly, a manually operated brake system, and electronically operated brake system, a hydraulic brake system, or another brake system, as desired. The brake assembly 332 may be engaged to prevent rotation of the wheel while the vehicle is stationary (parked, stopped, no velocity relative to the ground 29, etc.). The brake assembly 332 may include a parking brake actuator which may be powered by cable, pneumatic, hydraulic, or other power transmission systems.

The axle assembly 232 further includes a steering assembly having a connecting rod 344 connected between the steering arms 340, 340', and a centering system having a right spring damper 348 connected between the axle beam 292 and the right steering arm 340 and a left spring damper 348' connected between the axle beam 292 and the left steering arm 340'. The connecting rod 344 ties the right wheel assembly 320 to the left wheel assembly 324 so that rotation of the wheel assemblies 320, 324 is coordinated. In other words, the right wheel assembly 320 is inhibited from rotating relative to the left wheel assembly 324. The right spring damper 348 and the left spring damper 348' act to bias the wheel assemblies 320, 324 toward a center position (e.g., a position that drives straight). The connecting rod 344 is arranged vertically between the upper links 240, 244 and the lower links 248, 252 and in front of the axle beam 292. Additionally, the caster angle of the wheel assemblies 320, 324 can be changed to move the steering axis in forward or backward, as desired.

Figure 6:
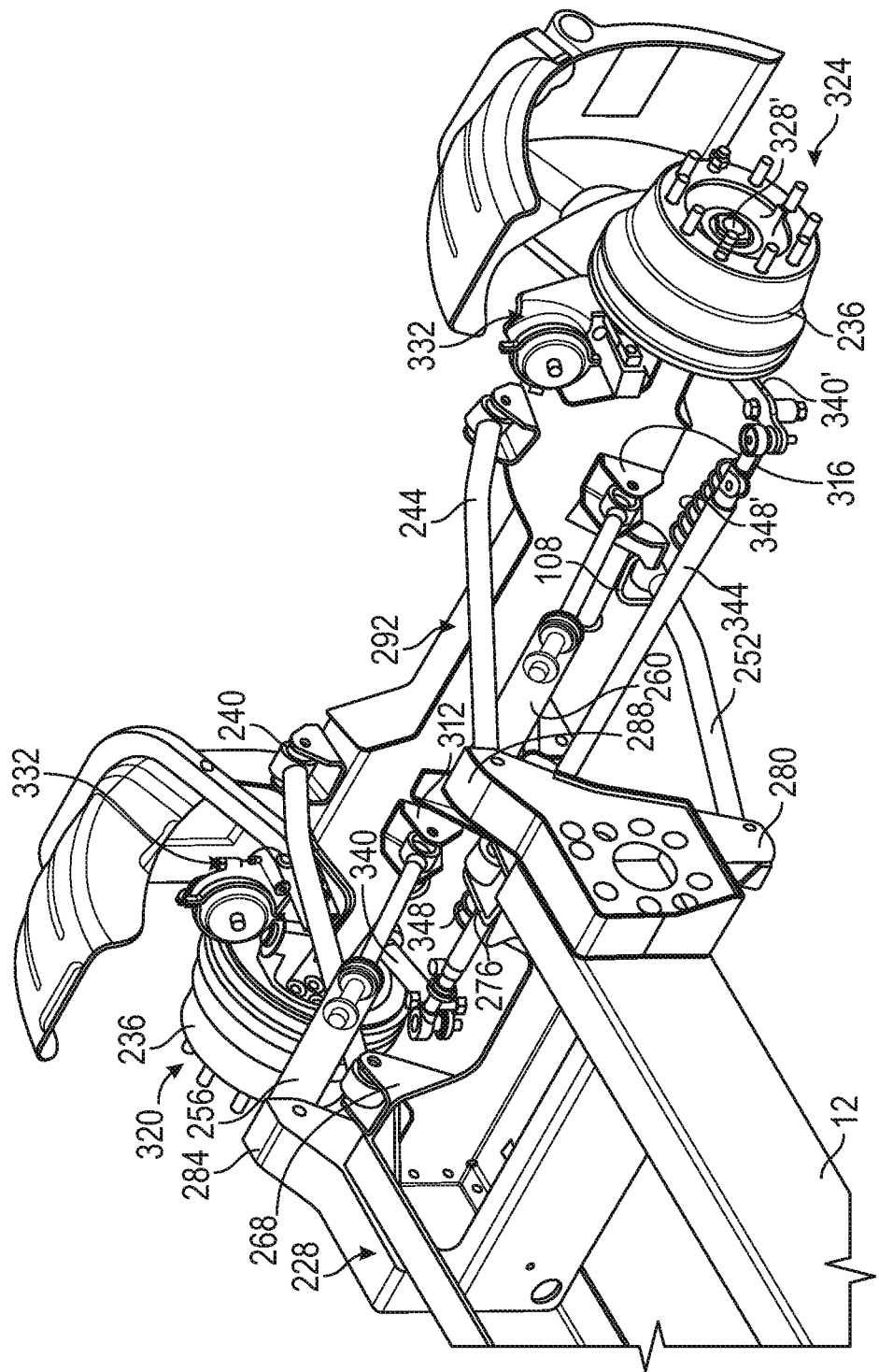
FIG. 6 is a detail perspective view of the tag axle system of the auxiliary axle system of FIG. 4, according to an exemplary embodiment.
Figure 7:
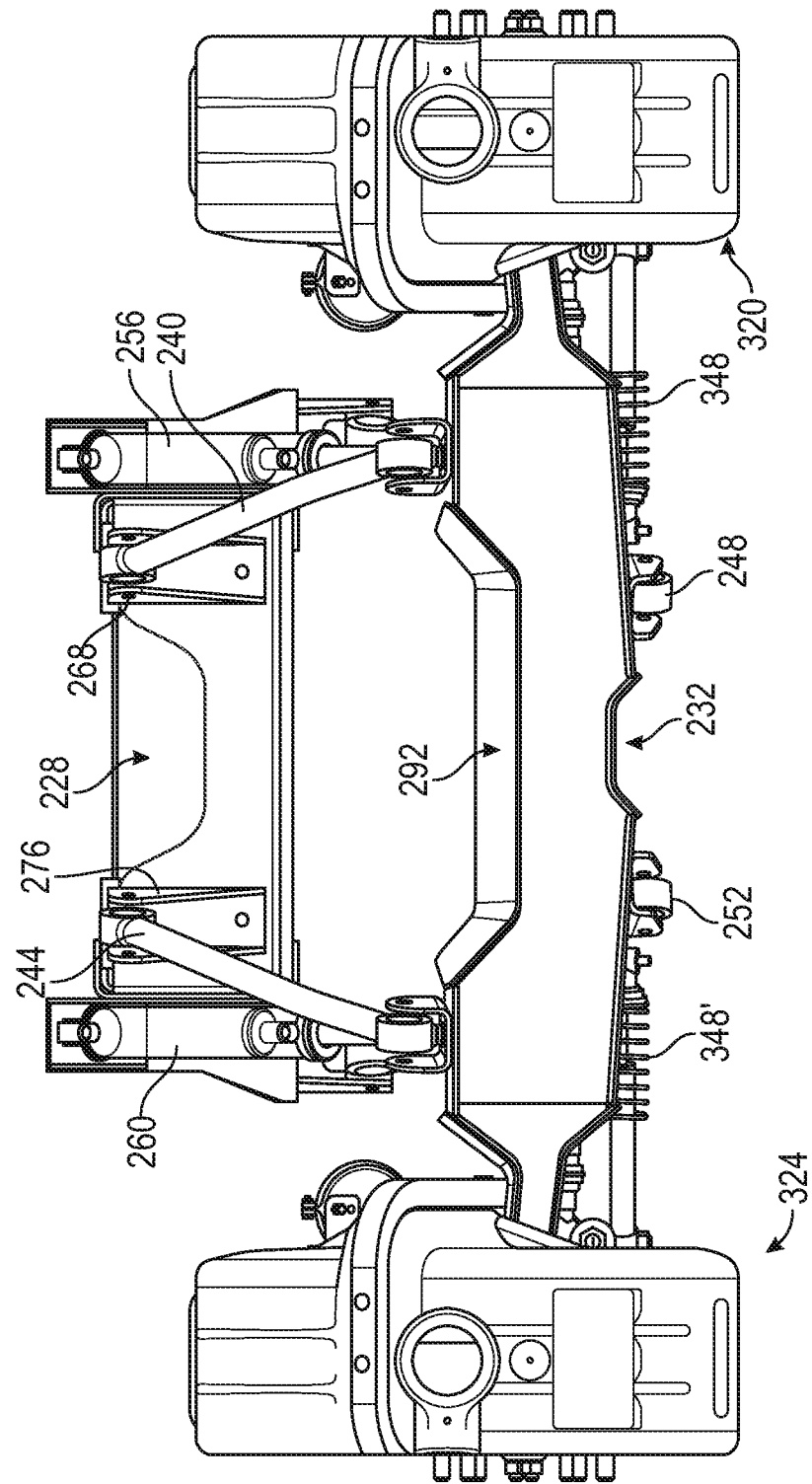
FIG. 7 is a rear view of the tag axle system of the auxiliary axle system of FIG. 4, according to an exemplary embodiment.
Figure 8:
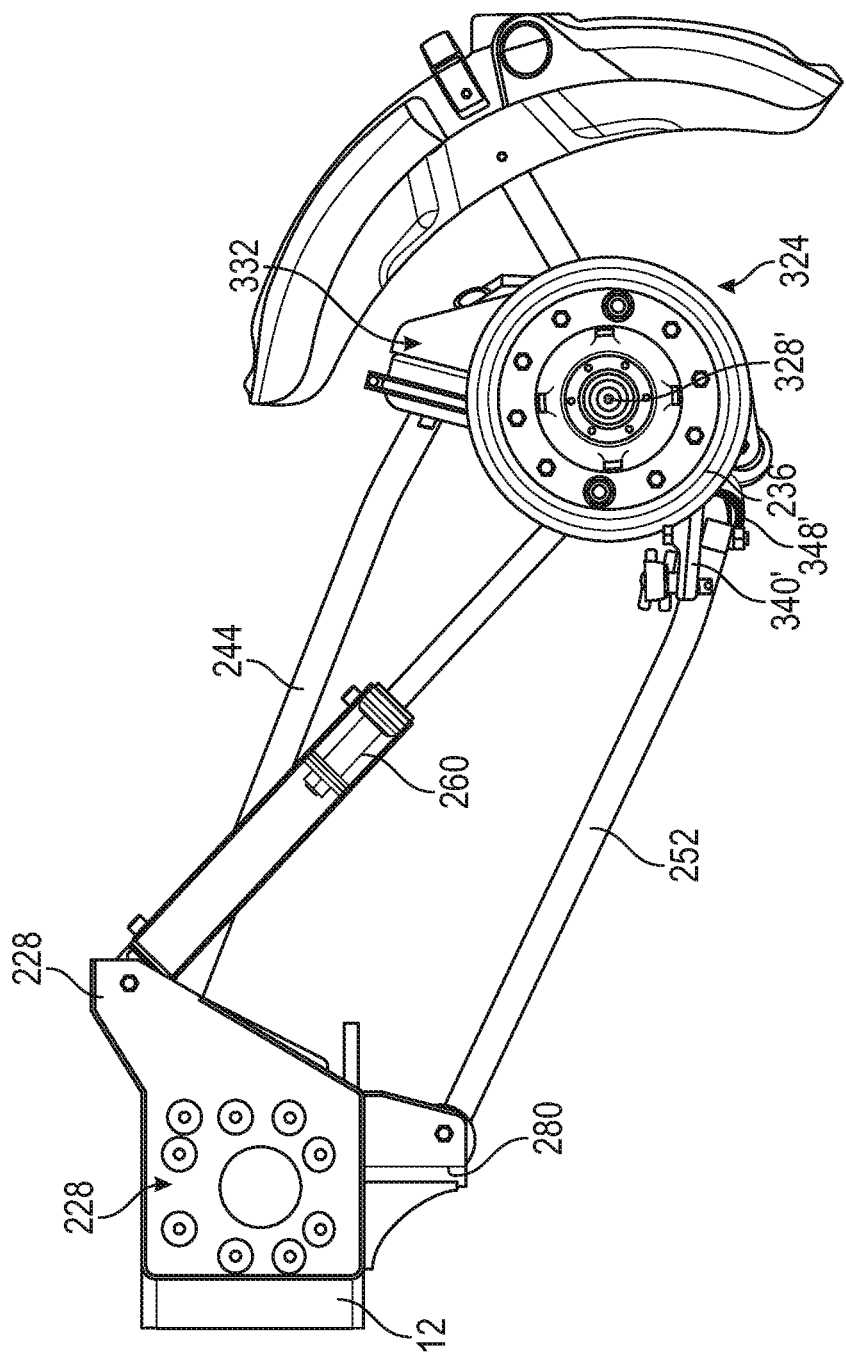
FIG. 8 is a side view of the tag axle system of the auxiliary axle system of FIG. 4, according to an exemplary embodiment.
Figure 9:
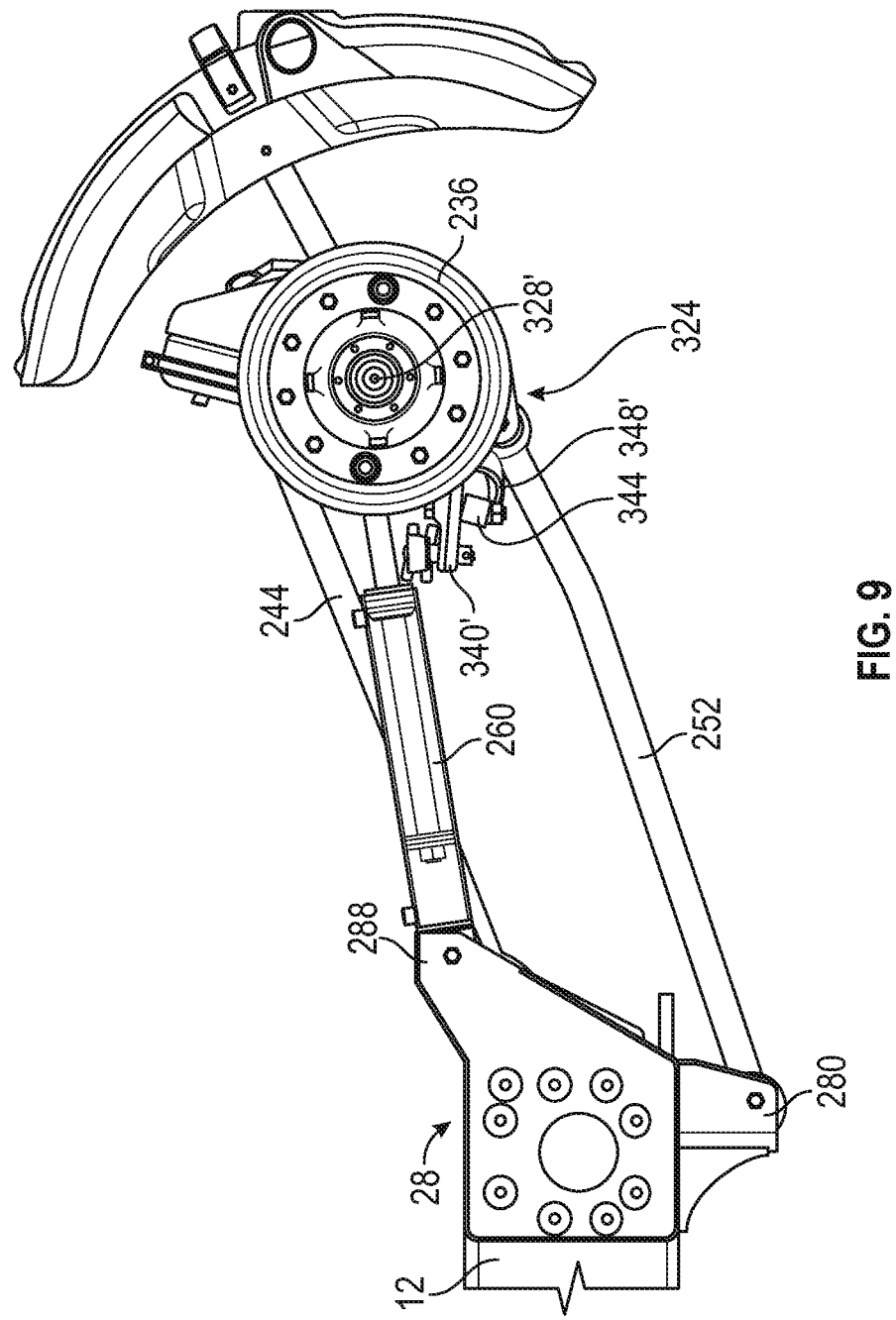
FIG. 9 is a side view of the tag axle system of FIG. 4 in a raised position, according to an exemplary embodiment.
Figure 10:
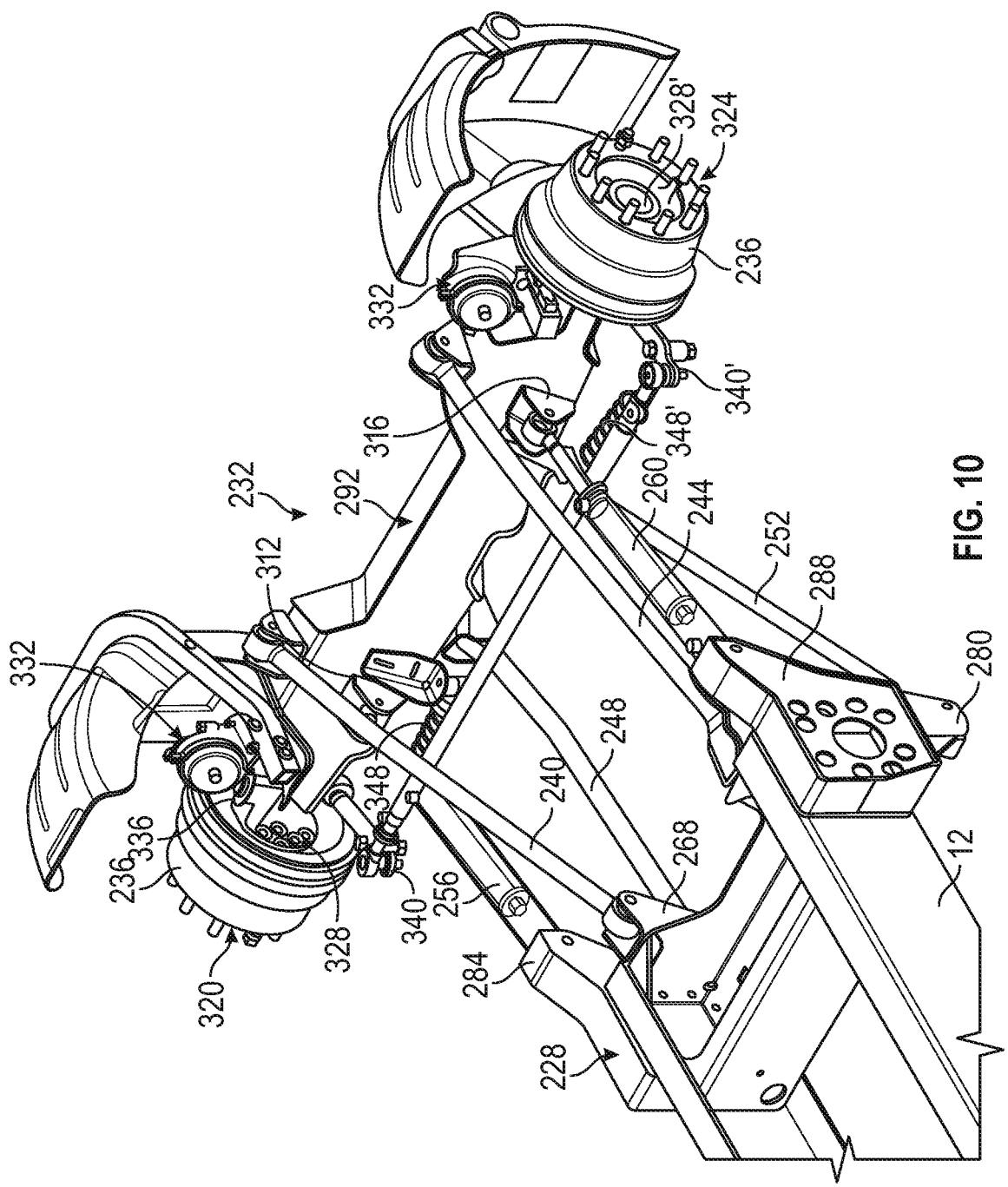
FIG. 10 is a perspective view of the tag axle system of FIG. 4 in a raised position, according to an exemplary embodiment.
Figure 11:
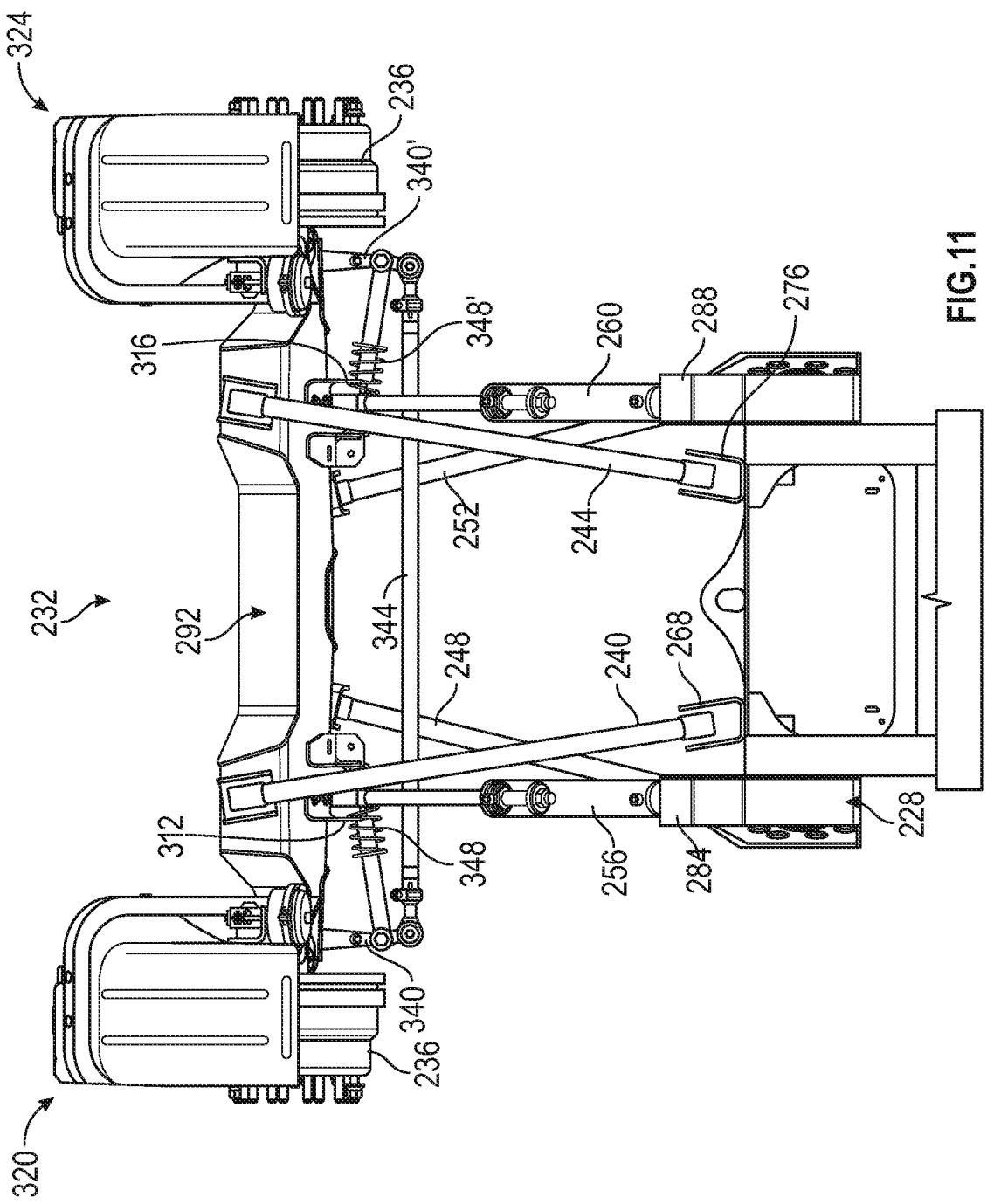
FIG. 11 is a top view of the tag axle system of FIG. 4, according to an exemplary embodiment.
Figure 12:
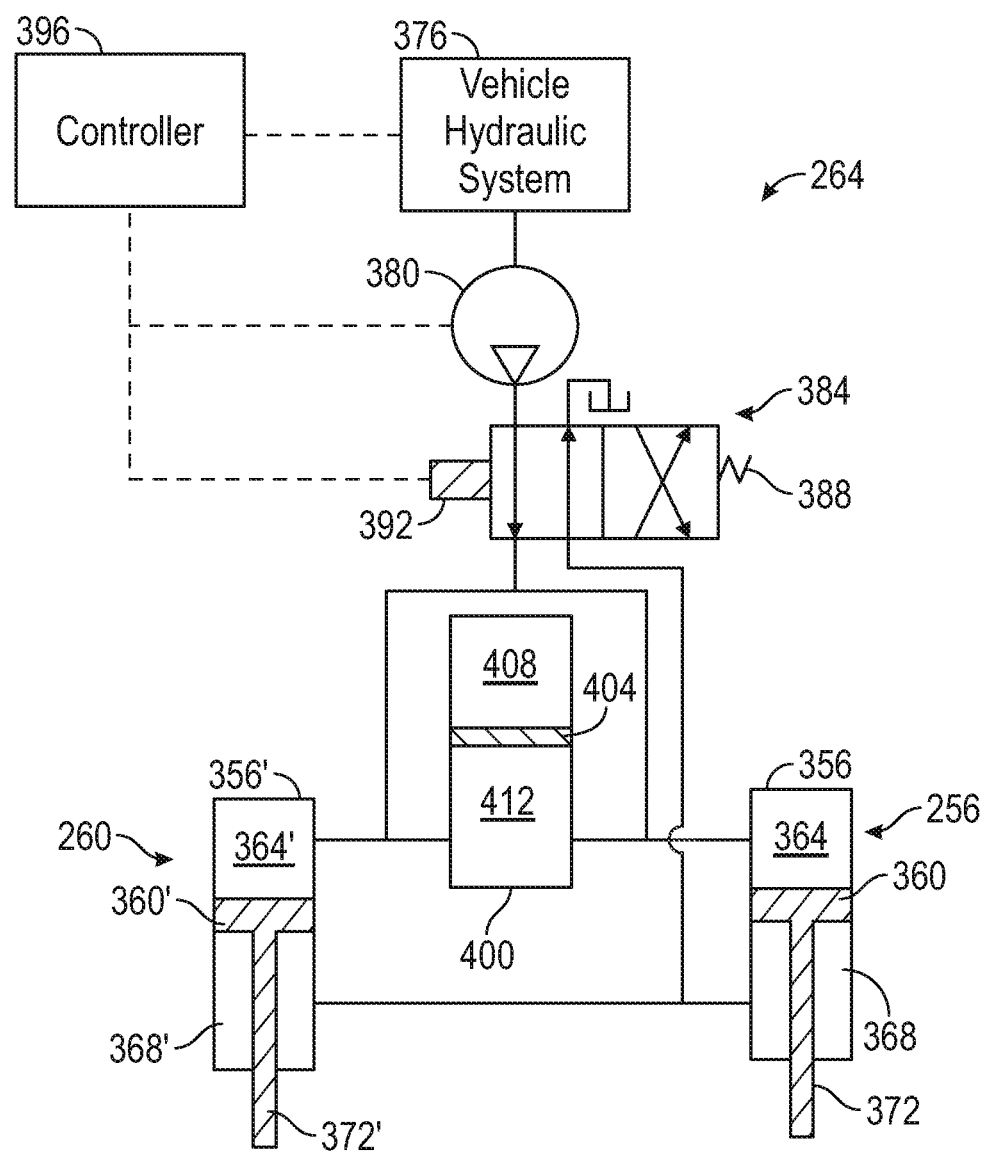
FIG. 12 is a schematic diagram of a hydraulic system of the tag axle system of FIG. 4, according to an exemplary embodiment.

As shown in FIG. 9-11, when in the raised position, the spindles/knuckles 328, 328' are raised above the vehicle chassis 12. In the lowered position, as shown in FIGS. 4-8, the spindles/knuckles 328, 328' are lowered below the vehicle chassis 12. FIGS. 6 and 8 show a perspective view of the LSTA system 200 in the lowered position and raised position, respectively. FIGS. 8 and 9 show a side view of the LSTA system 200 in the lowered position and raised position, respectively. FIG. 7 shows a rear view of the LSTA system 200 in the lowered position. FIG. 11 shows a top view of the LSTA system in the lowered position. In some embodiments, the raised and lowered positions are different than shown. For example, in some embodiments, the spindles/knuckles 328, 328' may be raised or lowered to different angles relative to a plane (e.g., horizontal plane, longitudinal plane) of the frame 28. Generally, the Auxiliary Axle Control System As shown in FIG. 12, a hydraulic system 264 includes a right hydraulic cylinder 260 and a left hydraulic cylinder 256. The right hydraulic cylinder 256 includes a cylinder 356 structured to couple with the right actuator mount bracket 284, a plunger 360 dividing the cylinder 356 into a first chamber 364 and a second chamber 368 that is isolated from the first chamber 364, and a rod 372 extending from the plunger 360 and structured to couple with the right actuator axle bracket 312. The left hydraulic cylinder 260 is substantially similar to the right hydraulic cylinder 256 and includes a cylinder 356' structured to couple with the left actuator mount bracket 288, a plunger 360' dividing the cylinder into a first chamber 364' and a second chamber 368' that is isolated from the first chamber 364', and a rod 372' extending from the plunger 360' and structured to couple with the left actuator axle bracket 316. The right hydraulic cylinder 256 and the left hydraulic cylinder 260 are dual action hydraulic cylinders that can be actively driven between a retracted position corresponding to the raised position of the LSTA system 200 and an extended position corresponding to the lowered position of the LSTA system 200.

In some embodiments, the hydraulic system 264 includes a vehicle hydraulic system 376 that controls various systems and subsystem of the vehicle. In some embodiments, the vehicle hydraulic system 376 operates the concrete mixer, a vehicle suspension system, a vehicle transmission, and/or other vehicle systems. A pump 380 is arranged in communication with the vehicle hydraulic system 376 and operable to provide high pressure hydraulic fluid to a control valve 384. In some constructions, the control valve 384 is a two-position four-way spool valve that includes a return spring 388 and a solenoid 392. In some constructions, the control valve 384 may include a double acting inching circuit, or another control architecture, as desired. A controller 396 is arranged in communication with the vehicle hydraulic system 376, the pump 380, and the control valve 384 to control operation of the LSTA system 200 between the raised position (e.g., a lift mode) and the lowered position (e.g., a suspension/operational mode).

In some embodiments, the hydraulic system 264 also includes an accumulator 400. In one embodiment, the accumulator 400 includes a movable element, shown as a piston 404. The movable element (e.g., the piston 404, a diaphragm, etc.) separates a spring chamber 408 from a collecting chamber 412 that is in fluid communication with the first chamber 364 of the right hydraulic cylinder 256 and the first chamber 364' of the left hydraulic cylinder 260. In some embodiments, the spring chamber 408 is charged with nitrogen or another gas to a predetermined pressure calibrated to a desired spring rate. In some embodiments, the spring chamber 408 is in communication with a pressure source (e.g., a pneumatic compressor) and maintained at the predetermined pressure. The piston 404 with moveable within the accumulator 400 to compress the gas in the spring chamber 408 thereby prompting a spring force in opposition to the movement. In other words, the predetermined pressure in the spring chamber 408 exerts a bias or a spring force against the piston 404 toward the collecting chamber 412. In some embodiments, the accumulator 400 is mounted at a location that is remote from the hydraulic cylinders 256, 260. For example, the accumulator 400 may be located on a portion of the concrete mixer truck 10 spaced from the hydraulic cylinders 256, 260. In some embodiments, the accumulator is in direct fluid communication or indirect fluid communication with the hydraulic cylinders 256, 260. In some embodiments, one or more components of the accumulator 400 is integral to one or more of the hydraulic cylinders 256, 260. In some embodiments, the hydraulic system 264 includes one hydraulic cylinder (e.g., right hydraulic cylinder 256, left hydraulic cylinder 260). In some embodiments, the LSTA system includes more than one hydraulic cylinder (e.g., two cylinders, three cylinders, etc.).

Still referring to FIG. 12, when the controller 396 controls actuation to the lowered position (as shown), the control valve 384 is moved to a first position and the pump provides high pressure hydraulic fluid to the first chambers 364, 364' of the hydraulic cylinders 256, 260 and the collecting chamber 412 of the accumulator 400. The high pressure hydraulic fluid exerts force on the plungers 360, 360' and the rods 372, 372' are moved to the extended position so that the LSTA system 200 is arranged in the lowered position (i.e., the suspension/operational mode). As the vehicle moves over uneven terrain, forces and movement may be imparted to the LSTA system 200. In some embodiments, the right hydraulic cylinder 256 and the left hydraulic cylinder 260 are structured as suspension elements. As a suspension force acts on the rods 372, 372' hydraulic fluid is pushed from the first chambers 364, 364' into the collecting chamber 412 of the accumulator 400 against the spring force of the spring chamber 408. As the piston 404 moves within the accumulator 400, the spring force increases and the piston 404 is forced toward the collecting chamber 412 and the rods 372, 372' are again extended. In this way, a spring/damper (i.e., spring damper) suspension system is provided by the same cylinders (e.g., the right hydraulic cylinder 256 and the left hydraulic cylinder 260) that are used for actuation between modes. The accumulator 400 increases the reaction speed of the hydraulic system 264 when it is acting as a suspension system. The controller 396 controls the pump 380 to maintain a constant pressure within the hydraulic cylinders 256, 260 so that a desired ground force is maintained.

When the controller 396 controls actuation to the raised position, the control valve 384 is moved to a second position so that high pressure hydraulic fluid is provided from the pump 380 to the second chambers 368, 368' of the hydraulic cylinders 256, 260 thereby retracting the rods 372, 372'. In some embodiments, the return spring 388 biases the control valve to the second position so that the second position is the rest position. In some embodiments, the return spring 388 is arranged to bias the control valve 384 toward the first position. In some embodiments, the control of the control valve 384 is arranged differently. For example, the control valve 384 may utilize pilots, more solenoids, manual controls, or other control architectures.

Figure 14:
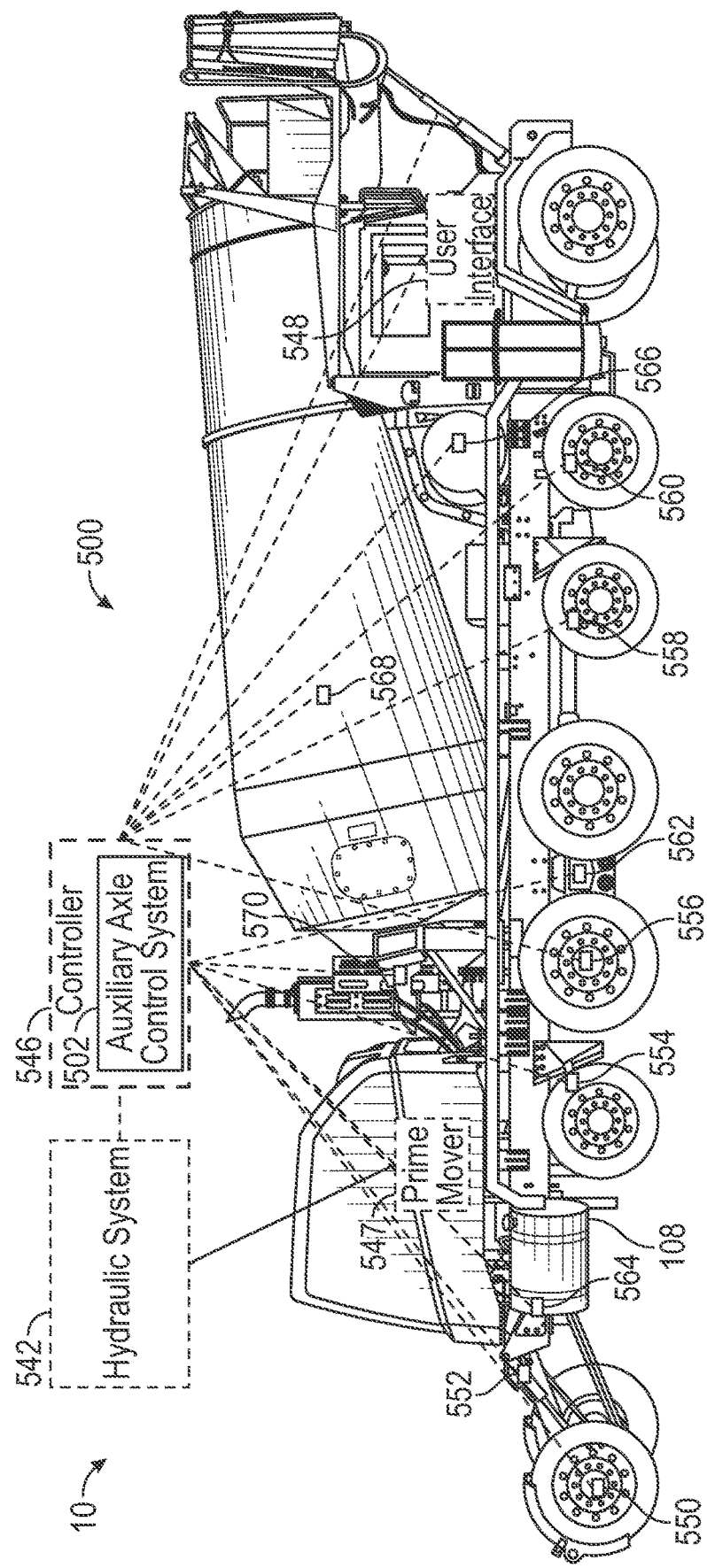
FIG. 14 is a side view of the concrete mixer truck of FIG. 4 with the auxiliary axle control system of FIG. 13, according to an exemplary embodiment.

As shown in FIG. 14, a system 500 for controlling an auxiliary axle of a work vehicle (e.g., concrete mixer vehicle 10) is shown, according to some embodiments. In some embodiments, the system includes an auxiliary axle control system 502. The auxiliary axle control system 502 may include a processing circuit 504. The processing circuit 504 can include a processor 506 and a memory 508. The processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers, and/or modules described herein. Memory 508 can be or include volatile memory or non-volatile memory. Memory 508 can include database components, object code components, script components, or any other type of information structure for supporting the various activities and information structures described in the present application. In some embodiments, memory 508 is communicably connected to processor 506 via processing circuit 504 and includes computer code for executing (e.g., by processing circuit 504 and/or processor 506) one or more processes described herein.

In some embodiments, the auxiliary axle control system 502 is implemented within a single computer (e.g., one server, one housing, etc.). In various other embodiments, auxiliary axle control system 502 is distributed across multiple servers or computers (e.g., various computers on-board concrete mixer truck 10, various local or remote servers, etc.).

Still referring to FIG. 14, the memory 508 includes a vehicle load manager 510. The vehicle load manager 510 can include a load planner 512, a load detector 514, an operation data database 516, and/or an operation data collector 518. In some embodiments, the memory 508 includes a rules manager 520. The rules manager 520 may include a rules maintainer 522, a rules database 524, a location-based rules enforcer 526, and a rules enforcer 528. The vehicle load manager 510, rules manager 520, and their components are described with reference to FIGS. 14-15.

In some embodiments, the auxiliary axle control system 502 includes a communications interface 530. The communications interface 530 can be or include wired or wireless communication interfaces (e.g., jacks, antennas, transmitters, receivers, transceivers, wire terminals, etc.) for conducting data communications with external systems or devices. In some embodiments, communications via communications interface 530 can be direct (e.g., local wired or wireless communications) or via a network 532. In some embodiments, the network 532 may be or include a wireless access network (WAN), the Internet, a cellular network, or still other suitable communication networks. In some embodiments, communications interface 530 can include a WiFi transceiver for communicating via a wireless communications network. In some embodiments, communications interface 530 may be or include cellular or mobile phone communications transceivers.

In some embodiments, the system 500 includes a portable device, shown as user device 534, a network 532, and/or an external computing system resource (e.g., system resource, database, server, processor, virtual resource, etc.), shown as device 536. In some embodiments, one or more of the user device 534, the network 532, and/or device 536 may be communicably connected to the auxiliary axle control system 502 (e.g., via communications interface 530). In some embodiments, the user device 534 may be a portable computing device which may include a processing circuit. In some embodiments, the user device 534 may connect to a network (e.g., network 532). In some embodiments, the user device 534 may facilitate a connection between the auxiliary axle control system 502 and the network (e.g., network 532). For example, the user device 534 may be a smartphone that has a cellular connection to the Internet and a short-range wireless connection to the communications interface 530. In such example, the auxiliary axle control system 502 may communicate with the Internet via a connection between the communications interface 530 and the user device 534.

In some embodiments, the device 536 may be or include one or more servers, databases, memory devices, processing circuits, or any other virtual or physical resource for the auxiliary axle control system 502. In some embodiments, the device 536 may include a repository of data from one or more auxiliary axle control systems 502. In some embodiments, the device 536 is structured and programmed to collect and store data from the auxiliary axle control system 502. In some embodiments, the device 536 includes one or more rules or algorithms for optimizing the performance of one or more of the components of the auxiliary axle control system 502. The one or more rules or algorithms for optimizing the one or more components of the auxiliary axle control system 502 may optimize performance based on data from one or more auxiliary axle control systems 502. In some embodiments, the device 536 is a system (e.g., computer system) usable by an administrator or producer of work vehicles and/or auxiliary axle control system 502. In some embodiments, device 536 may provide updates (e.g., software updates, software upgrades) for one or more components of the auxiliary axle control system 502. For example, the device 536 may update (e.g., populate, modify, manage, etc.) data stored in memory 508 and/or any component or portion of memory 508 (e.g., operation data database 516, rules database 524, etc.).

In some embodiments, the user device 534 and/or the device 536 include input devices (e.g., buttons, keyboards, touch sensitive surfaces, cameras, microphones, etc.) and output devices (e.g., displays, speakers, etc.). In some embodiments, the user device 534 is associated with an operator (e.g., user, driver, etc.) of a work vehicle (e.g., concrete mixer truck 10). In some embodiments, data from the auxiliary axle control system 502 may be presented to a user of the auxiliary axle control system 502 via the user device 534. For example, the user device 534 may indicate a system status (e.g., operating, inactive, offline, fault, error, etc.) or other system setting (e.g., suspension setting, vehicle operational mode, terrain mode, current user preferences, etc.) via a display and/or other output device. In some embodiments, the user device 534 and/or device 536 may facilitate a user interacting with the auxiliary axle control system 502.

Still referring to FIG. 14, the system 500 includes vehicle equipment 540. The vehicle equipment 540 may be or include one or more actuators (e.g., electric motors, valves, fans) and sensors (e.g., position sensors, orientation sensors, velocity sensors, accelerometers, temperature sensors, weight sensors, volume sensors, angular position sensors, pressure sensors, etc.) for collecting data from the concrete mixer vehicle. In some embodiments, vehicle equipment 540 includes any controllable and/or electronically observable components of the concrete mixer vehicle 10. For example, a controllable component may be an actuator, a heating element, a pump, a motor, or other electronically influenced component. An electronically observable component may be a tire pressure (e.g., of one or more wheels 4), vehicle weight, fuel level, or other electronically monitored (e.g., sensed, detected) component or aspect of concrete mixer vehicle 10. In some embodiments, the vehicle equipment 540 includes auxiliary axle equipment (e.g., LSTA system 200, pusher axle 168, tag axle 198, etc.).

In some embodiments, the hydraulic system 542 is the similar to or different than the hydraulic system 264. The hydraulic system 542 may include at least one actuator (e.g., hydraulic cylinders 256, 260, hydraulic motor, etc.), accumulator (e.g., accumulator 400), control valve (e.g., control valve 384, pneumatically operated control valve, hydraulically operated control valve, electrically operated control valve, etc.), pump (e.g., pump 380, gear pump, vane pump, piston pump, etc.), check valve, filter, and/or reservoir. In some embodiments, the reservoir may hold a volume of hydraulic fluid for use in one or more hydraulic circuits of the hydraulic system 542. The reservoir may be a heat sink, and may transfer heat away from the hydraulic system 542 (e.g., to the ambient environment). The filter may filter contaminants from the hydraulic fluid flowing through a hydraulic circuit of the hydraulic system 542. The check valve may prevent backflow of hydraulic fluid in a hydraulic circuit. The check valve may also ensure a pressure is maintained downstream of the check valve. The pump may pressurize the hydraulic fluid in the hydraulic system by displacing fluid volume against a resistant load or pressure. For example, the pump may pressurize hydraulic fluid in a hydraulic circuit to move the LSTA system 200. The control valve may control the flow of hydraulic fluid in the hydraulic system 542. For example, the control valve may start, stop, or direct a flow hydraulic fluid between or within one or more hydraulic circuits. The accumulator may maintain a pressure, reduce pressure spikes, store energy, and/or reduce vibrations in the hydraulic system. The actuator may convert energy imparted into the hydraulic fluid (e.g., from the pump) into mechanical energy. For example, a hydraulic cylinder may convert hydraulic energy into motion (e.g., raising or lowering an auxiliary axle) and work (e.g., lifting or pivoting the auxiliary axle). In some embodiments, the actuator directs energy to generate the desired force between one or more auxiliary axle (e.g., auxiliary axles 200, 198, 168) and the surface supporting the concrete mixer truck 10 (e.g., road 29).

Still referring to FIG. 14, the system includes a controller 546. The controller 546 may be the same as or similar to the controller 396. In some embodiments, the controller 546 is a component of the auxiliary axle control system 502. In some embodiments, the controller 546 may receive signals from the auxiliary axle control system 502 and generate control signals for the vehicle equipment 540, and/or hydraulic system 542. For example, the auxiliary axle control system 502 may determine a position setpoint (e.g., raised, lowered, retracted, extended, 10 degrees, etc.) for an auxiliary axle system (e.g., LSTA system 200), and the controller 546 may generate one or more control signals or a sequence of control signals based on the signals from the auxiliary axle control system 502. For example, the controller 546 may generate a pump duty cycle, a control valve position, and a hydraulic system pressure setpoint, and signals based on the signals from the auxiliary axle control system 502. In another example, the controller 546 may receive feedback from the vehicle equipment 540 and/or hydraulic system 542 and the controller 546 may adjust a control variable value based on the feedback. For example, the controller may be or include a proportional controller (P controller), a proportional integral controller (PI controller), a proportional integral derivative controller (PID controller), and/or other suitable control structures. In some embodiments, controller 546 includes a processing circuit. In some embodiments, the controller 546 is a component stored within memory 508.

In some embodiments, one or more components of the hydraulic system 542 are electronically controlled and/or observed by the auxiliary axle control system 502. For example, the pump and control valve may be controllable by the auxiliary axle control system 502, and a pressure generated by the pump may be monitored or observed by a pressure sensor communicably connected to the auxiliary axle control system 502. In some embodiments, various pressure sensors and position sensors may provide sensor data to the auxiliary axle control system 502 and/or the controller 546.

Still referring to FIG. 14, the system 500 includes a global positioning system 544, according to some embodiments. The global positioning system 544 may determine location data of the work vehicle (e.g., concrete mixer vehicle 10) and provide the location data to the auxiliary axle control system 502. In some embodiments, the global positioning system 544 is a component of the auxiliary axle control system 502. In some embodiments, the global positioning system 544 includes a processing circuit.

In some embodiments, the system 500 further includes a user interface 548. The user interface 548 may facilitate a user of the auxiliary axle control system 502 (e.g., a work vehicle operator) interacting with (e.g., viewing, manipulating, modifying, controlling, changing, updating, etc.) one or more components of the auxiliary axle control system 502. For example, user interface 548 may be or include one or more output devices (e.g., a display, LCD screen, system status indicator or light, etc.) and/or one or more input devices (e.g., a touch sensitive surface, button, keyboard, camera, microphone, etc.). In some embodiments, at least a portion of the user interface 548 may be located within view of an operator of the work vehicle during normal operation of the work vehicle. For example, a first portion of the user interface 548 (e.g., a first touch sensitive display) may be located within the cab of the work vehicle, and a second portion of the user interface 548 (e.g., a second touch sensitive display) may be located in a control panel outside of the cab of the work vehicle. In some embodiments, the auxiliary axle control system 502 includes more than one user interface 548. In some embodiments, the user interface 548 is remote (e.g., wirelessly connected). In some embodiments, the user interface 548 facilitates a user to overriding or canceling one or more control decisions or control signals generated by the auxiliary axle control system 502. In some embodiments, the user interface 548 facilitates a user accepting (e.g., granting permission) to complete a control decision generated by the auxiliary axle control system 502. In some embodiments, each of components 534, 536, 540, 542, 544, 546, and 548 of the system 500 may communicate over a network (e.g., a synchronous or asynchronous network).

Figure 13:
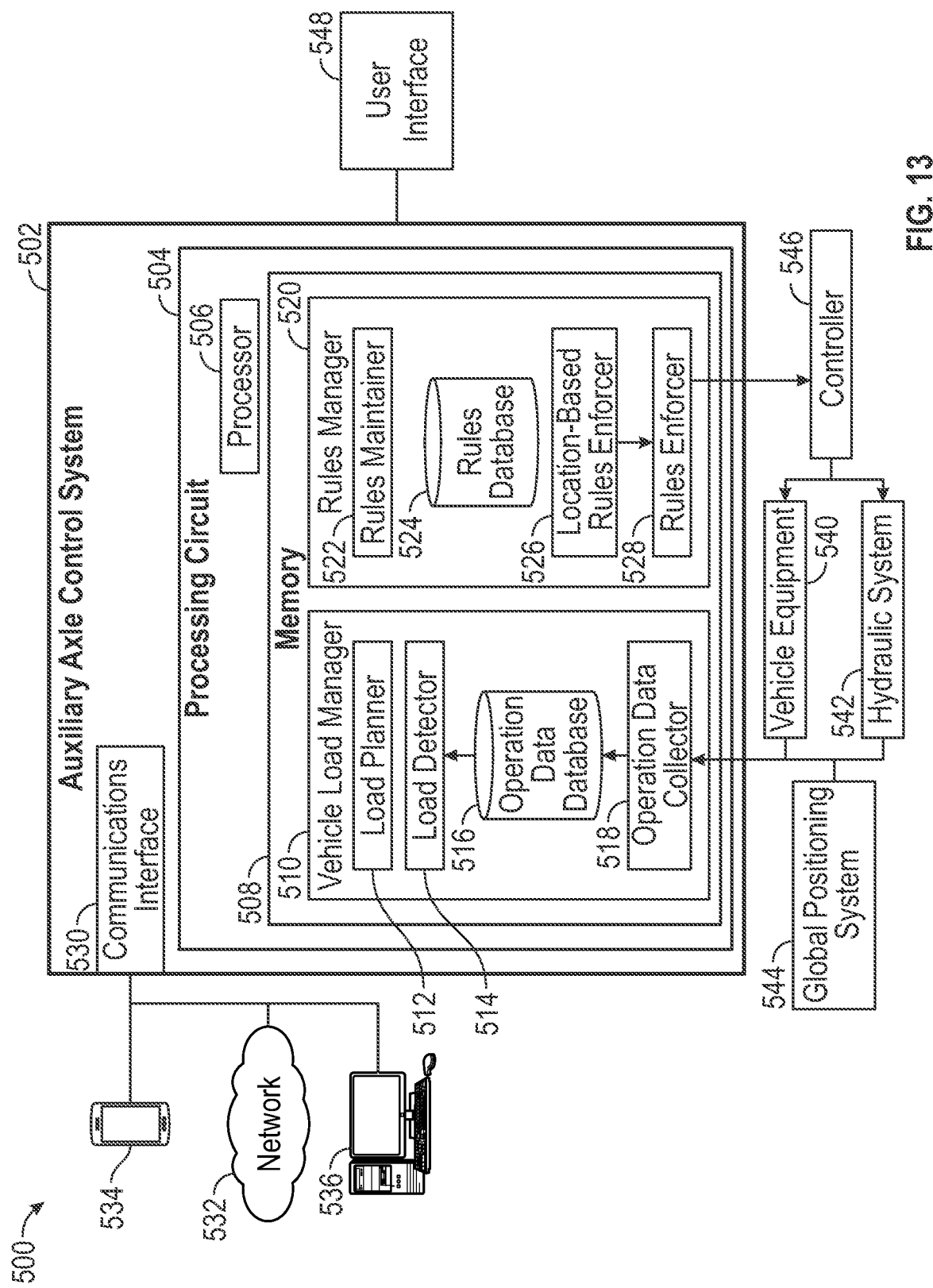
FIG. 13 is a block diagram of an auxiliary axle control system, according to an exemplary embodiment.

As shown in FIG. 14, a work vehicle (e.g., concrete mixer vehicle 10) includes a system 500, according to some embodiments. The concrete mixer vehicle 10 of FIG. 13 may have some or all of the features and components described with respect to the concrete mixer vehicle 10 of FIGS. 1-5. For example, FIG. 4 may supplement FIG. 14. In some embodiments, the controller 546 may be or include the auxiliary axle control system 502. The controller 546 may be communicably connected to one or more sensors, actuators and/or other electronic devices. In some embodiments, the controller 546 is connected to the hydraulic system 542 and a prime mover 547. The prime mover 547 may include an engine (e.g., engine module 110, an internal combustion engine, etc.) for generating mechanical and electrical power for the various systems and components of the concrete mixer vehicle 10. In some embodiments, the prime mover 547 may consume a fuel stored in the fuel system 108. In some embodiments, the hydraulic system 542 and/or system 500 are powered by the prime mover 547. As described above, in some embodiments, the concrete mixer vehicle 10 is a purely electric vehicle that does not include an internal combustion engine and, as such, is driven by electrical energy in all modes of operation. In such embodiments, the concrete mixer truck 10 may not include a fuel tank, and may include one or more electrical energy storage devices (e.g., batteries, capacitors, etc.). In some embodiments, the prime mover 547 is or includes an electric motor or a series of electric motors. In some embodiments, each axle or wheel 4 is driven by one or more electric motors. In some embodiments, the concrete mixer truck 10 includes one or more wheel hub motors (e.g., in-wheel motors).

In some embodiments, the controller 546 is communicably connected to multiple sensors and actuators of the concrete mixer vehicle 10. For example, the concrete mixer vehicle 10 includes a LSTA system sensor 550, a LSTA hydraulic actuator sensor 552, a tag axle system sensor 554, a drive wheel sensor 556, and two pusher axle sensors 558, 560. The sensors 550, 554, 556, 558, 560 may be or include one or more pressure sensors (e.g., for detecting a tire pressure, an axle pressure, an axle load, a braking pressure, a hydraulic circuit pressure, etc.), a position sensor (e.g., for detecting a position of one or more of the axles), an accelerometer (e.g., for detecting dynamics of the auxiliary axle acting as a suspension component), and still other sensors for monitoring the axles and loading conditions of the concrete mixer vehicle 10. In some embodiments, the concrete mixer vehicle 10 may include at least one suspension system sensor 562, a storage tank sensor (e.g., fuel tank sensor 564, water tank sensor 566, drum fill sensor 568, etc.), a drum sensor 570, and other sensors for determining a state of the concrete mixer vehicle 10. In some embodiments, the various sensors onboard the concrete mixer vehicle 10 may be used to determine a dynamic (e.g., transient) weight of the concrete mixer vehicle 10.

Figure 15:
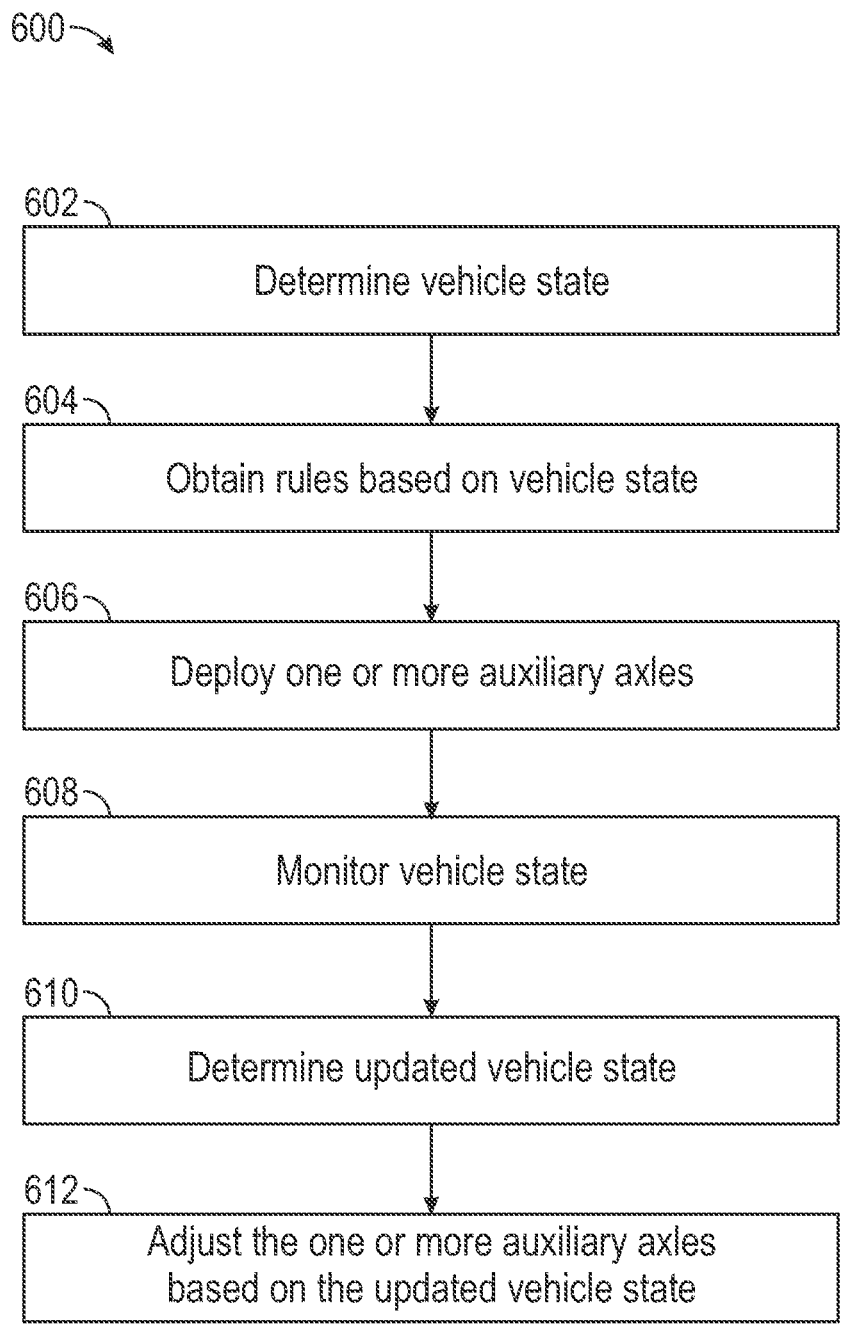
FIG. 15 is a flow diagram of controlling an auxiliary axle using an auxiliary axle control system, according to some embodiments.

Referring now to FIG. 15, a flow diagram of a process 600 for controlling an auxiliary axle is shown, according to some embodiments. Process 600 may be performed by a data processing system (e.g., auxiliary axle control system 502), which may be communicably connected to a work vehicle (e.g., concrete mixer vehicle 10). Process 600 may include any number of steps and the steps may be performed in any order.

At a step 602, the data processing system determines the state of the work vehicle, according to some embodiments. A state of the work vehicle may include a vehicle loading condition, a vehicle location, and a vehicle operating condition. In some embodiments, a vehicle loading condition may be or include a total vehicle weight, a payload weight, and/or a load distribution. In some embodiments, the data processing system determines the vehicle loading condition from data supplied by a user of the auxiliary axle control system 502. For example, an operator may input the current payload weight (e.g., estimation or actual) via user interface 548, and/or an administrator may input the weight based on an anticipated payload kind (e.g., cement, dirt, liquid, etc.) and volume ordered using the device 536. In some embodiments, the load planner 512 may store the load data supplied by the user (e.g., operator and/or administrator). In some embodiments, the load planner 512 determines the static (e.g., fixed) and dynamic (e.g., transient) vehicle weight. The dynamic weight may include the weight of consumable materials (e.g., fuel, water, payload, etc.) supported by the frame. The static weight may include the weight of non-consumable materials (e.g., the frame, transmission, prime mover, etc.). The load planner 512 may determine the rate of consumption of various consumable materials, and may determine the expected vehicle load based on the expected rate of consumption. For example, the load planner 512 may determine the expected rate of fuel consumption based on the current state of the vehicle (e.g., fuel level, operation mode, etc.) and adjust a user-supplied load value accordingly.

In some embodiments, the state of the work vehicle is determined by the vehicle load manager 510 based on vehicle operation data. For example, the vehicle load may be determined based on data collected by operation data collector 518. In some embodiments, the operation data collector 518 may collect data from the vehicle equipment 540, hydraulic system 542, and/or global positioning system 544. The data collected by the operation data collector 518 may be stored in the operation data database 516. The data collected by the operation data collector 518 may be collected at regular intervals (e.g., 0.1 second, 1 second, 30 seconds, 1 minute, etc.). In some embodiments, the data collected by the operation data collector 518 includes pressure sensor data, strain gauge data, tank fill level sensor data, motion sensor data, and position sensor data. The data collected by the operation data collector 518 may be used by the load detector 514 to determine an estimated vehicle load. In some embodiments, the load detector 514 may determine an estimation of the vehicle load by analyzing various current and previous system sensor data (e.g., pressures, positions, strain gauge values, etc.). In some embodiments, the load detector 514 may determine a load distribution. For example, the load detector 514 may determine a load on each axle of the work vehicle. In some embodiments, the load detector 514 determines the load on each axle by analyzing a pressure or position of a suspension component associated with the axle. For example, one or more of a tire pressure, spring pressure, air spring pressure, spring displacement, or other pressure or position of a suspension component may be used to estimate a current payload and/or load.

At a step 604, the data processing system obtains a set of rules based on the state of the work vehicle, according to some embodiments. In some embodiments, the rules manager 520 may query rules database 524 for rules based on the vehicle load determined by the load detector 514 and/or the load planner 512. The rules database 524 may be a repository of rules for various work vehicles. In some embodiments, the rules stored in rules database 524 may be based on vehicle load, vehicle location, vehicle operation mode, and other vehicle operation data. In some embodiments, the rules stored in rules database 524 are periodically updated by rules maintainer 522. In such embodiments, the rules maintainer 522 may periodically communicate with one or more external devices (e.g., device 536) to determine if an update for rules database 524 is available. For example, the rules maintainer 522 may communicate with device 536 to determine if an update to one or more of the rules stored in rules database 524 is available, and may facilitate the update.

In some embodiments, the rules manager 520 uses operation data collected by operation data collector 518 and/or stored in operation data database 516 to determine a set of rules for the current state of the work vehicle. The rules manager 520 may determine the state of the work vehicle by determining a loading condition (e.g., vehicle load and load distribution), vehicle location (e.g., Wisconsin, New York, etc.), and/or current operating mode (e.g., highway, city, off-road, parked, etc.). The rules manager 520 may use the current loading condition to determine what, if any, auxiliary axles should be deployed to maintain the load per axle below a threshold value defined by the rules manager 520. In some embodiments, the rules manager 520 may use a formula including variables representing an overall gross weight on any group of two or more consecutive axles, a number of axles in the group of axles, and a distance between the outer axles of any group of two or more consecutive axles. In some embodiments, the rules manager 520 may use the Federal Bridge Formula to determine a desirable load per axle.

In some embodiments, the rules manager 520 may use the vehicle location to determine local laws and regulations for vehicle loads (e.g., location A may be maximum X weight per axle, and a location B may be maximum Y weight per axle), as well as any user defined settings for the location (e.g., mode settings, suspension settings, etc.). The rules manager 520 may use the current operating mode to define a pressure applied to the auxiliary axle(s). For example, a rule may include a condition that if the vehicle is parked and the load per axle is above the threshold based on the local laws, an auxiliary axle (e.g., LSTA system 200) should be deployed at a particular pressure. In some embodiments, a rule may include a condition that if the vehicle is not parked (e.g., a parking brake is disengaged), the pressure applied to any or all of the deployed auxiliary axles should be reduced (e.g., set to a pressure setpoint that is less than a parked pressure setpoint). In some embodiments, a rule may include a condition that if the vehicle is operating off road (e.g., on uneven or unstable terrain), an auxiliary axle should be deployed to stabilize the vehicle regardless of the vehicle weight or loading condition. In some embodiments, a rule may include a condition that if the work vehicle is no longer parked (e.g., no longer stationary, a parking brake is engaged, etc.), a brake pressure of the one or more auxiliary axles should be relieved. A person having ordinary skill in the art will appreciate that a large number of rules and combinations of rules are possible, and the rules provided above should not be regarded as limiting.

In some embodiments, a rule may include a condition that if a prime mover is supplying power to rotate a wheel of the concrete mixer truck 10, a parking brake associated with the auxiliary axles should be disengaged, deactivated, or otherwise release the wheel such that the wheel can rotate. For example, an auxiliary axle may have a parking brake controlled to prevent rotation of a wheel (by engaging a corresponding parking brake) while the auxiliary axle system is in a raised position (e.g., the wheel(s) thereof are not engaging the road 29), but may be controlled to automatically disengage the parking brake and thereby permit rotation of the wheel based on a determination that one or more wheels coupled to the chassis are being powered to rotate (e.g., a prime mover is driving wheels to move a chassis forward). Auxiliary axle systems may span behind or extend underneath a chassis which may prevent or delay detection of a dragging wheel (e.g., a wheel that is prevented from rotating while being forced onto the ground 29 and pulled by traction of the other wheels that are being rotated). For example, an operator may not receive auditory signals (tire screeching) or visual signals (smoke, skidding marks, etc.) for a period of time. The data processing system may generate command signals to disengage the parking brake(s) and prevent rapid wear (e.g., balding, rupturing, etc.) of the wheels and/or other components of the auxiliary axle system (e.g., rupturing of hydraulic lines, overheating, overloading motors, etc.).

At a step 606, the data processing system deploys one or more auxiliary axles, according to some embodiments. In some embodiments, the data processing system applies the set of rules. In some embodiments, the rules enforcer 528 and the location-based rules enforcer 526 make control decisions based at least partially on the rules stored in rules database 524. For example, the location-based rules enforcer 526 may obtain (e.g., retrieve) and enforce (e.g., apply, consider, evaluate) a set of rules based on the current location of the work vehicle. For example, if the work vehicle crosses a geographic boundary (e.g., a state line), the location-based rules enforcer 526 may obtain a set of rules based on the current location from the rules database 524. The rules enforcer 528 may obtain and enforce a set of rules based on various conditions. For example, the rules enforcer 528 may determine the vehicle's operational condition based on a user supplied input (e.g., disengaging a parking brake, pushing a button, ignition on, etc.), or an indirect user input (e.g., detecting that the vehicle is in motion), and obtain and evaluate rules corresponding to the operational condition. The location-based rules enforcer 526 and the rules enforcer 528 may apply obtained rules by determining one or more states of the work vehicle and generating control decisions for controlling the work vehicle based on at least one state of the work vehicle and the obtained rules.

In some embodiments, the auxiliary axle control system 502 provides command signals to the controller 546 to deploy one or more auxiliary axles according to the rules stored in rules manager 520. The controller 546 may control one or more actuators of the work vehicle according to various setpoints and control variable values supplied by the auxiliary axle control system 502. In some embodiments, the auxiliary axle control system 502 outputs a target pressure setpoint (e.g., to generate a desired ground force) for each auxiliary axle available onboard the work vehicle. In some embodiments, the control variable values and setpoints supplied by the auxiliary axle control system 502 include threshold values for controlling the vehicle equipment. For example, an upper threshold and/or a lower threshold may be defined for any controllable variable (e.g., ground pressure, hydraulic pressure, etc.), and the controller 546 may control the vehicle equipment 540 and hydraulic system 542 to operate within the threshold values.

At a step 608, the data processing system monitors the state of the work vehicle (e.g., operating condition, loading condition, vehicle location, etc.), according to some embodiments. The auxiliary axle control system 502 may collect operation data using operation data collector 518 after deploying one or more auxiliary axles.

At a step 610, the data processing system may determine an updated vehicle state, according to some embodiments. In some embodiments, operation data and/or any data stored in vehicle load manager 510 may be used by the rules manager 520 to generate updated control decisions based on current or recently obtained operation data (e.g., a vehicle location, a vehicle loading condition, an operating mode, etc.). For example, operation data may be used by the auxiliary axle control system 502 to determine that a different auxiliary axle pressure setpoint is required to satisfy one or more rules. In some embodiments, an updated state is determined by the data processing system when the value of one or more control variables falls outside of a tolerance band. In such embodiments, the data processing system may determine an updated state of the vehicle to identify different rules and/or generate updated control signals to regain control of the controllable variable.

At a step 612, the data processing system may adjust one or more auxiliary axles based on the updated vehicle state. For example, the concrete mixer vehicle 10 may leave a batch plant in an initial state (e.g., a full tank of fuel and full payload) and an auxiliary axle system (e.g., the LSTA system 200) may be deployed according to one or more rules stored in rules database 524 based on the initial state. The auxiliary axle control system 502 may monitor the state of the work vehicle at time intervals (e.g., 1 microsecond, 1 second, 10 seconds, 30 seconds, 5 minutes, 1 hour, etc.). For example, The concrete mixer vehicle 10 may drive for a period of time and eventually consume enough fuel to cause the loading condition to change (e.g., cause a reduced load on an axle). Based on the changed state, the auxiliary axle control system 502 may detect that a control variable (e.g., a pressure of LSTA system 200) is outside of a threshold (e.g., outside of a minimum and/or maximum pressure). An updated state of the system may be defined by the auxiliary axle control system which may be used by the rules manager to change and modify (e.g., actuate, control, adjust) the LSTA system 200.

The auxiliary axle control system discussed above provides for an advantageous auxiliary axle control for heavy vehicles that provides an adaptive method of managing and optimizing the support of a load based on states and rules associated with the work vehicle. Further, conventional auxiliary axle control may be time consuming and prone to errors. Incorporating the data processing system and methods described herein advantageously facilitate an adaptive auxiliary axle system that can be operated in a much faster, safer and efficient manner. Advantageously, by adapting to and accommodating various states of the work vehicle (e.g., vehicle location, vehicle load, and/or operational modes), an error-free and efficient auxiliary axle control process can be executed.

Figure 16:
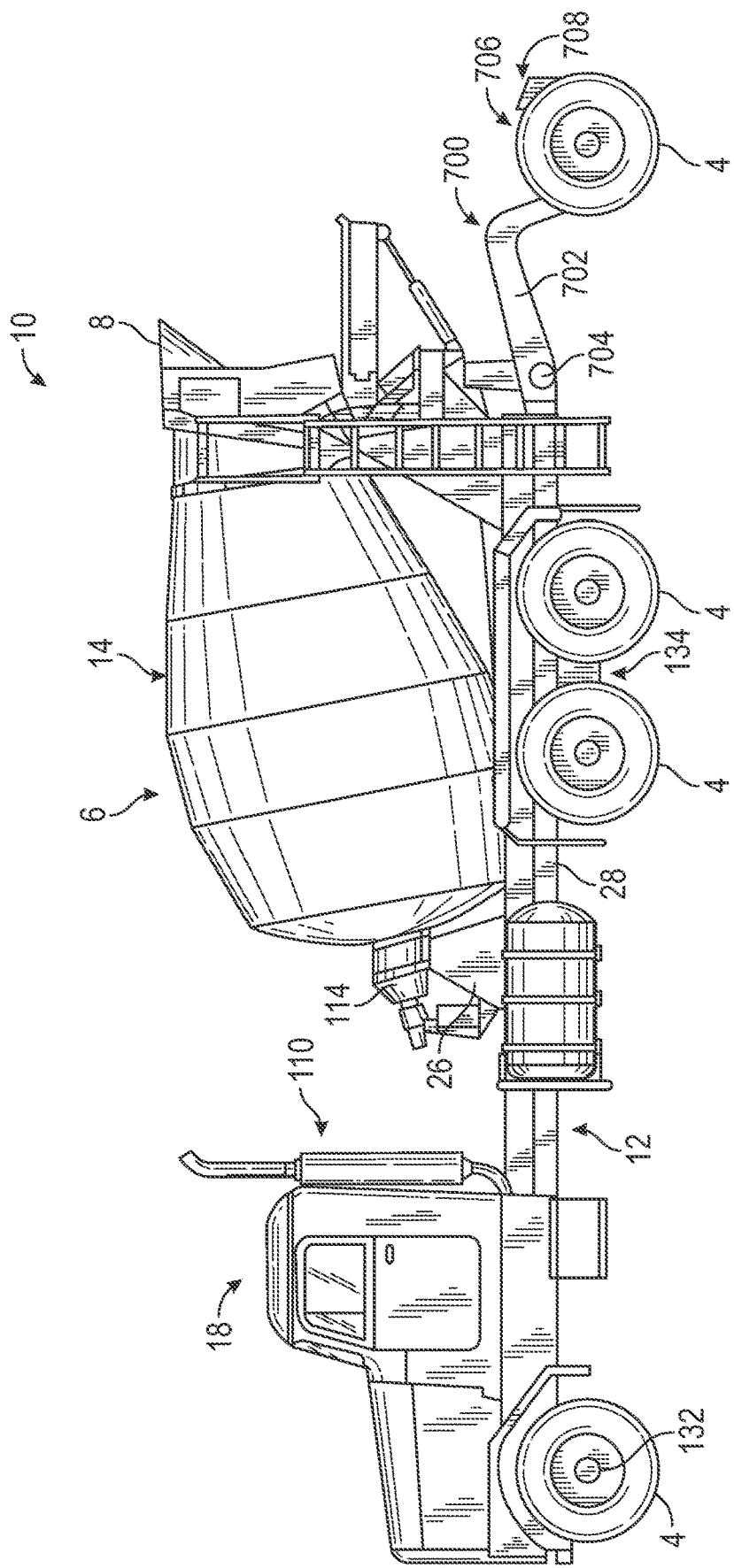
FIG. 16 is side view of a rear discharge configuration of the concrete mixer truck of FIG. 1 with an auxiliary axle system, according to an exemplary embodiment.
Figure 17:
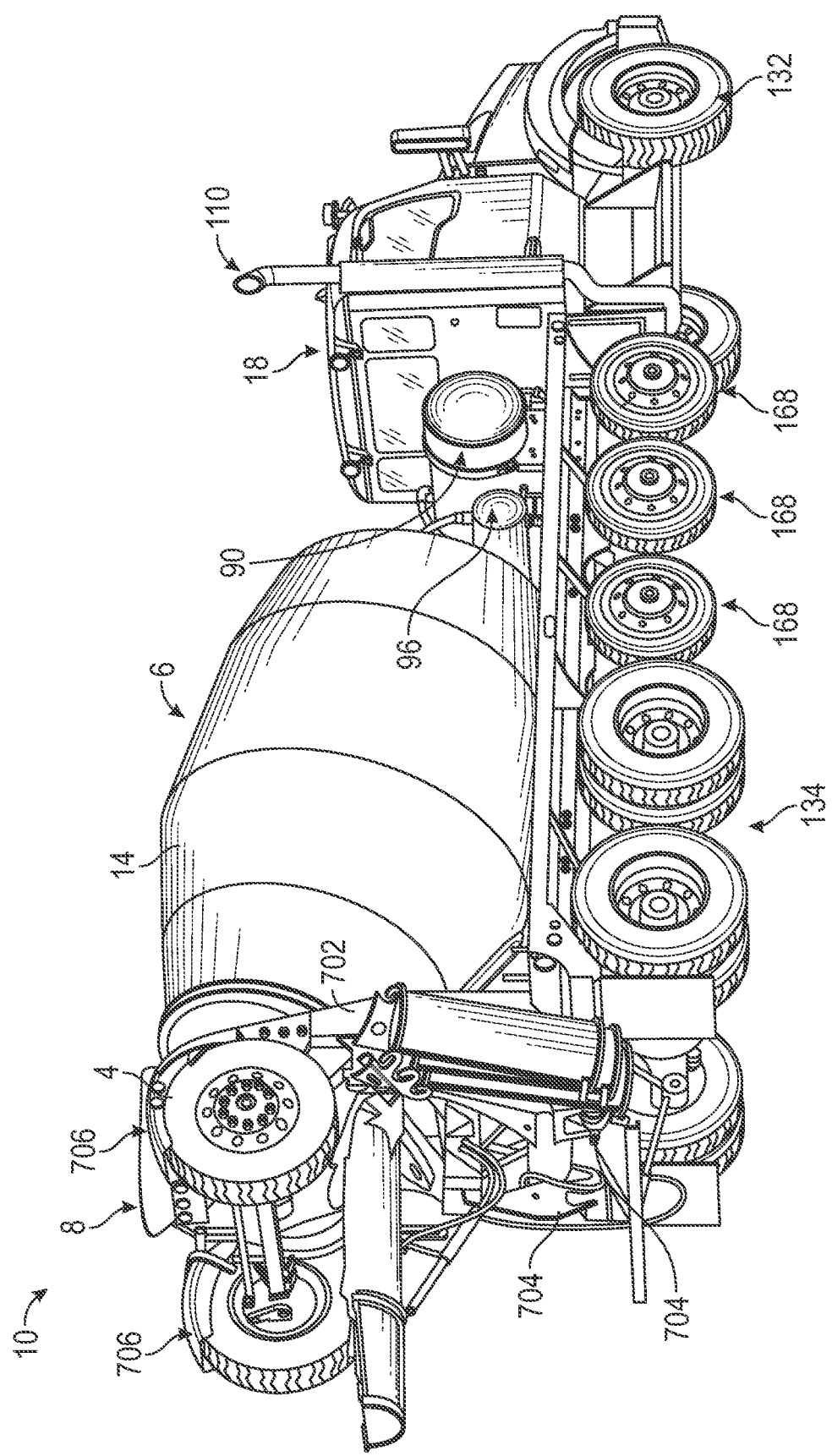
FIG. 17 is a perspective view of a rear discharge configuration of the concrete mixer truck of FIG. 1 with an auxiliary axle system, according to an exemplary embodiment.
Figure 18:
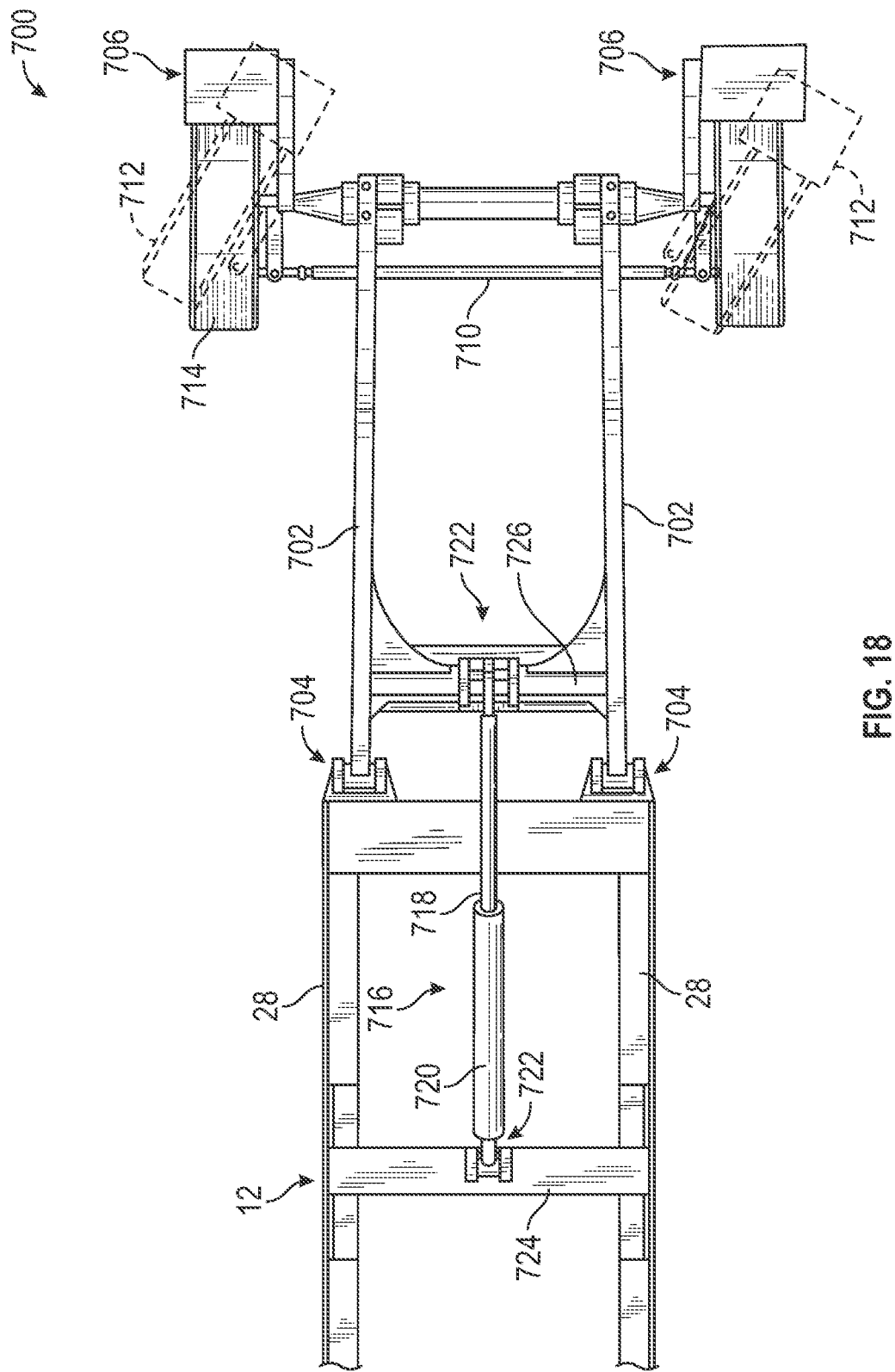
FIG. 18 is a detail perspective view of the tag axle system of the auxiliary axle system of FIG. 16, according to an exemplary embodiment.

As shown in FIGS. 16-18, the concrete mixer truck 10 is shown in a rear discharge configuration, according to some embodiments. The concrete mixer truck 10 may include some or all of the features described with respect to the concrete mixer truck 10 of FIGS. 1-5. The concrete mixer truck 10 includes a LSTA system 700. The LSTA system 700 may be the same as or different than the LSTA system 200. The LSTA system 200 may include some or all of the features described with respect to the LSTA system 700. The LSTA system 700 may include one or more LSTA pivot arm 702. The LSTA pivot arm 702 may be pivotably coupled with the chassis 12 and support the one or more wheel assemblies 706. The wheel assemblies 706 may be the same as or similar to the wheel assemblies 320, 324. The LSTA system 700 may be pivotably coupled with the chassis 12 via LSTA pivot 704. LSTA pivot 704 may be or include a pin, bearing, linkage, and/or other device supportive of pivoting and/or manipulating the position and contact pressure (e.g., contact pressure with the ground) of the LSTA system 700. As shown, the LSTA pivot 704 includes a pin. A person having ordinary skill in the art will appreciate that other configurations of a LSTA system are possible and are suitable for use with an auxiliary axle control system (e.g., the auxiliary axle control system 502 described above) and the LSTA system 200 and LSTA system 700 described herein are not intended to be limiting.

In some embodiments, the LSTA system 700 is coupled to the chassis 12 by LSTA pivots 704. The LSTA pivot arms 702 include rigid members that connect the wheel assemblies 706 to the chassis 12. The LSTA system 700 includes a connecting rod 710 that is configured to connect the steering or turning motion between the wheel assemblies. The connecting rod 710 may be the same as or similar to the connecting rod 344. As shown, the wheel assemblies 706 are pivotable between a turned position 712 and a straight position 714. The straight position 714 may correspond to when the concrete mixer truck 10 is traveling in a linear direction. The turned position 714 may correspond to when the concrete mixer truck 10 is traveling in a curved direction (while turning). The turned position 712 may prevent the wheel assemblies 706 from being damaged when the vehicle is rotating or turning. In some embodiments, the position of the wheel assemblies 706 is monitored and controlled by the auxiliary axle control system 502.

In some embodiments, the LSTA system 700 includes a hydraulic cylinder 716. In some embodiments, the hydraulic cylinder 716 is similar to or different than the hydraulic cylinders 256, 260. The LSTA system 700 may include one or more cylinders (e.g., hydraulic), motors (e.g., hydraulic, electric, etc.), and/or other controllable actuators for actuating the LSTA system 700 between the raised position (e.g., as shown in FIG. 17), and the lowered position (e.g., as shown in FIG. 16). The hydraulic cylinder 716 a component of a hydraulic system (e.g., hydraulic system 542). The hydraulic cylinder 716 may include an integral accumulator (e.g., an accumulator 400 located within or on the hydraulic cylinder 716). In some embodiments, the hydraulic cylinder 716 is in communication with a remote accumulator (e.g., an accumulator 400 fluidly connected with the hydraulic cylinder via a length of conduit or tubing).

Still referring to FIGS. 16-18, the hydraulic cylinder 716 includes a rod 718 having a plunger within plunger housing 720. The hydraulic cylinder 716 is pivotably coupled on both ends to the LSTA pivot arms 702 and the chassis 12 at actuator pivots 722. The actuator pivots 722 are located near the middle of the frame cross member 724 and LSTA arm cross member 726. In some embodiments, the actuator pivots 722 are positioned differently than shown (e.g., toward the left side or right side of the concrete mixer truck 10). In some embodiments, the hydraulic cylinder 716 is sized and positioned to achieve a desired contact pressure and range of motion. In some embodiments, the hydraulic cylinder 716 is sized and positioned to avoid interference with other components of the concrete mixer vehicle. In some embodiments, more than one hydraulic cylinder 716 is used to achieve the desired contact pressure and range of motion of the LSTA system 700.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various processing steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "lowermost," "uppermost," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A work vehicle comprising:
    a chassis;
    an axle assembly coupled to the chassis and supporting a plurality of wheels;
    an actuator coupled to the chassis and the axle assembly, the actuator configured to transition the axle assembly between a raised position and a lowered position;
    a parking brake configured to selectively prevent rotation of the plurality of wheels;
    a controller comprising a processor and a memory, the controller configured to:
        determine a vehicle state based on data representing at least one of a vehicle load, a vehicle location, and a vehicle operating condition;
        operate the actuator to transition the axle assembly between the raised position and the lowered position based on the vehicle state;
        determine that the axle assembly is in the lowered position; and
        actuate the parking brake into a disengaged position to permit rotation of the plurality of wheels responsive to the determination that the axle assembly is in the lowered position.

2. The work vehicle of claim 1, wherein the vehicle state is based on the data representing the vehicle operating condition; and wherein the vehicle operating condition is based on a determination as to whether the parking brake is in an engaged position or the disengaged position.

3. The work vehicle of claim 1, wherein the controller is further configured to:
    determine that the axle assembly is in the raised position; and
    actuate the parking brake into an engaged position to substantially prevent rotation of the plurality of wheels responsive to the determination that the axle assembly is in the raised position.

4. The work vehicle of claim 1, further comprising one or more load sensors communicably coupled to the controller; wherein the vehicle state is based on the data representing the vehicle load; and wherein the vehicle load is based on signals from the one or more load sensors.

5. The work vehicle of claim 1, wherein the vehicle state is based on the vehicle load, and the vehicle load is based on a static weight and a rate of consumption of a consumable material supported by the chassis.

6. The work vehicle of claim 1, further comprising a positioning system configured to detect a location of the chassis, wherein the controller is further configured to:
    receive an indication from the positioning system of the chassis being in a first location;
    control a pressure applied to the actuator based on a first pressure setpoint that corresponds to the first location;

receive an indication from the positioning system of the chassis being in a second location that is different from the first location; and control the pressure applied to the actuator to a second pressure setpoint that corresponds to the second location and that is different from the first pressure setpoint.

7. The work vehicle of claim 6, wherein the first pressure setpoint and the second pressure setpoint correspond with local rules for vehicle loads in the first location and the second location, respectively.

8. The work vehicle of claim 1, wherein the controller is configured to maintain a pressure setpoint within the actuator when the axle assembly is in the lowered position; wherein the pressure setpoint is associated with a load supported by the axle assembly.

9. The work vehicle of claim 1, wherein the controller is configured to determine a pressure setpoint for the actuator based on the vehicle state.

10. The work vehicle of claim 1, wherein the controller is further configured to:
   determine a first pressure setpoint for the actuator and a second pressure setpoint for the actuator, the second pressure setpoint different than the first pressure setpoint;
   based on a determination that the chassis is stationary, operate the actuator at the first pressure setpoint; and
   based on a determination that the chassis is not stationary, operate the actuator at the second pressure setpoint.

11. The work vehicle of claim 1, wherein the axle assembly comprises a four-bar swing linkage and a wheel rotatably coupled to a second end of the four-bar swing linkage.

12. The work vehicle of claim 1, wherein the axle assembly comprises a wheel and is configured to maintain contact pressure between the wheel and a supportive surface when in the lowered position, and prevent the contact pressure between the wheel and the supportive surface when in the raised position.

13. The work vehicle of claim 1, wherein the actuator comprises a hydraulic cylinder.

14. The work vehicle of claim 1, wherein the axle assembly is coupled to a rear end of the chassis.

15. The work vehicle of claim 1, wherein the axle assembly is a first axle assembly pivotally coupled to a rear end of the chassis; further comprising:
   a second axle assembly coupled to the chassis; and
   a second actuator coupled to the chassis and the second axle assembly and configured to transition the second axle assembly between a second raised position and a second lowered position.

16. The work vehicle of claim 15, wherein the first axle assembly is a load span tag axle and the second axle assembly is a pusher axle.

17. A work vehicle comprising:
   a chassis;
   an axle assembly pivotally coupled to the chassis and supporting a plurality of wheels;
   an actuator coupled to the chassis and the axle assembly, the actuator configured to transition the axle assembly between a raised position and a lowered position;
   a parking brake configured to selectively prevent rotation of the plurality of wheels;
   one or more sensors configured to detect a location of the chassis; and
   a controller comprising a processor and a memory, the controller configured to:
      obtain rules based on the location of the chassis;
      determine whether the chassis is stationary based on signals from the one or more sensors;
      operate the actuator to transition the axle assembly between the raised position and the lowered position based on the determination whether the chassis is stationary and the rules;
      determine that the axle assembly is in the lowered position; and
      actuate the parking brake into a disengaged position responsive to the determination that the axle assembly is in the lowered position.

18. The work vehicle of claim 17, wherein the parking brake is configured to:
   prevent rotation of a wheel when in an engaged position; and
   permit rotation of the wheel when in the disengaged position, wherein the controller is further configured to:
   determine that the axle assembly is in the raised position; and
   actuate the parking brake into the engaged position responsive to the determination that the axle assembly is in the raised position.

19. A work vehicle comprising:
   a chassis;
   an axle assembly coupled to the chassis;
   an actuator coupled to the chassis and the axle assembly, the actuator configured to transition the axle assembly between a raised position and a lowered position;
   a positioning system configured to detect a location of the chassis;
   a parking brake actuator configured to transition a parking brake between an engaged position and a disengaged position; and
   a controller comprising a processor and a memory, the controller configured to:
      obtain one or more rules regarding a threshold axle load based on a vehicle load and the location of the chassis, wherein the threshold axle load differs depending on the location of the chassis;
      adjust a pressure applied by the actuator to the axle assembly based on the one or more rules; and
      actuate the parking brake actuator to transition the parking brake to an engaged position based on a determination that the axle assembly is in the raised position.

* * * * *